United States Patent [19]
Masaki et al.

[11] Patent Number: 5,917,785
[45] Date of Patent: Jun. 29, 1999

[54] DISK APPARATUS

[75] Inventors: Takashi Masaki; Shigenori Yanagi; Toru Fujiwara, all of Kawasaki, Japan

[73] Assignee: Fujitsu Limited, Kawasaki, Japan

[21] Appl. No.: 09/135,660

[22] Filed: Aug. 18, 1998

Related U.S. Application Data

[62] Division of application No. 08/683,121, Jul. 16, 1996, Pat. No. 5,796,697, which is a continuation of application No. 08/079,002, Jun. 17, 1993, abandoned.

[30] Foreign Application Priority Data

Jul. 3, 1992 [JP] Japan .................................. 4-176306
Jul. 3, 1992 [JP] Japan .................................. 4-176307

[51] Int. Cl.$^6$ ............................ G11B 17/22; G11B 33/02
[52] U.S. Cl. .............................................. 369/32; 369/75.2
[58] Field of Search ................................. 369/75.1–75.2, 369/77.1–77.2, 258, 264, 266, 176, 32; 360/73.01, 94, 78.09, 78.01, 78.04

[56] References Cited

U.S. PATENT DOCUMENTS

| | | | |
|---|---|---|---|
| 4,627,037 | 12/1986 | Tamaru et al. | 369/77.2 |
| 4,965,683 | 10/1990 | Otani | 360/94 |
| 5,012,166 | 4/1991 | Ushijima et al. | 318/254 |
| 5,124,971 | 6/1992 | Nomura et al. | 369/215 |
| 5,126,897 | 6/1992 | Ogawa et al. | 360/78.09 |
| 5,164,934 | 11/1992 | Kase et al. | 369/77.1 |
| 5,220,257 | 6/1993 | Yoshino et al. | 318/254 |
| 5,267,110 | 11/1993 | Ottesen et al. | 360/106 |
| 5,289,097 | 2/1994 | Erickson et al. | 318/561 |
| 5,298,840 | 3/1994 | Yoshino et al. | 318/268 |
| 5,416,646 | 5/1995 | Shirai | 360/46 |
| 5,796,697 | 8/1998 | Masaki et al. | 369/75.2 |

FOREIGN PATENT DOCUMENTS

| | | |
|---|---|---|
| 0418702A2 | 3/1991 | European Pat. Off. . |
| 3925777A1 | 7/1990 | Germany . |
| 62-243162 | 10/1987 | Japan . |
| 1211271 | 8/1989 | Japan . |
| 2244457 | 9/1990 | Japan . |
| 334150 | 2/1991 | Japan . |
| 3104020 | 5/1991 | Japan . |
| 4205963 | 7/1992 | Japan . |
| 63-149864 | 6/1998 | Japan . |

*Primary Examiner*—Allen T. Cao
*Attorney, Agent, or Firm*—Greer, Burns & Crain Ltd.

[57] ABSTRACT

A disc apparatus has a cartridge loading/unloading mechanism to perform a loading operation for attaching an optical disc enclosed in a cartridge inserted from an outside to a rotary shaft of a spindle motor and an unloading operation for removing the optical disc from the rotary shaft of the spindle motor and for ejecting the cartridge to the outside. The loading operation of the cartridge loading/unloading mechanism is executed by the rotation of one direction of a load motor. The unloading operation of the cartridge loading/unloading mechanism is executed by the rotation in the reverse direction of the load motor. A drive current of the load motor is turned on or off at a short period, thereby adjusting so as to optimize a drive torque. When an exchangeable optical disc is loaded, a motor is activated, an initialization control is executed during the acceleration, and after a motor rotational speed reached a specific speed, the apparatus enables the writing/reading operations to be executed. When a voice coil motor is driven simultaneously with the spindle motor during the initialization adjustment, the drive current of the spindle motor is limited.

15 Claims, 23 Drawing Sheets

FIG.10

DISK APPARATUS

This is a divisional of application Ser. No. 08/683,121, filed Jul. 16, 1996, U.S. Pat. No. 5,796,697, which is a File Wrapper Continuation of Ser. No. 08/079,002 filed Jun. 17, 1993, now abandoned.

BACKGROUND OF THE INVENTION

The present invention relates to a disc apparatus which uses an exchangeable disc enclosed in a cartridge as a recording medium and, more particularly, to an optical disc apparatus for properly controlling a load motor to execute the loading operation and the unloading operation of an optical disc enclosed in a cartridge and for executing an initialization control during the acceleration of a spindle motor.

In an optical disc apparatus, memory capacity is very large and effective use as a memory device of a large capacity of a computer system is expected and miniaturization is also expected.

Among them, in the exchangeable optical disc apparatus, an optical disc enclosed in a cartridge is used as a recording medium. The loading operation when the cartridge is inserted into the optical disc apparatus and the unloading operation when the cartridge is taken out of the apparatus are automatically executed by a load motor. In order to certainly execute the loading and unloading operations without imposing a burden on the optical disc, it is demanded to properly control a driving torque of the load motor. In the exchangeable optical disc apparatus, further, it is demanded to limit a current consumption to thereby make it unnecessary to use a power source unit of a large current capacity and to reduce the size and costs.

Hitherto, the optical disc which is used in the optical disc apparatus in which a recording medium can be exchanged is ordinarily enclosed in a cartridge casing. When the cartridge casing is inserted into the optical disc apparatus, a shutter of the cartridge casing is opened by a shutter opening/closing mechanism in the apparatus, so that a hub for chucking of the optical disc and the disc surface that is accessed by an optical head are exposed. The chucking operation of the optical disc to a rotary shaft of a spindle motor is performed by driving a loading mechanism by the load motor. The optical disc is moved in the direction of the rotary shaft of the spindle motor by the loading operation. The optical disc is finally adsorbed and fixed by a magnet provided for a disc holding plate of the spindle rotary shaft. To reduce the costs of the apparatus, in the driving of the load motor, generally, a switching circuit which is known as a bridge driver is used. That is, by turning on or off a switching circuit which can switch the direction of a drive current by an instruction from an MPU, the load motor is rotated in the forward direction, thereby executing the loading operation. By rotating the load motor in the opposite direction, the unloading operation is executed.

In such a conventional control of the load motor to execute the loading operation and unloading operation of the optical disc enclosed in the cartridge casing, since the voltage which is applied to the load motor is fixed, the rotational speed of the motor depends on the torque of the motor. Therefore, when a motor of a large torque is used, speeds of the loading operation and unloading operation rise. However, since the burden which is imposed on the loading mechanism increases, the life of the load motor decreases. In the case where the optical disc apparatus is used as what is called a stand-alone apparatus in which the optical disc apparatus is enclosed as a deck in a jukebox or the like, the life of the loading mechanism is a very important performance. On the contrary, when the motor of a small torque is used, although the life of the loading mechanism is long, the times which are required for the loading operation and unloading operation increase.

Ordinarily, the chucking of the optical disc is performed by a magnet and, in the loading mode, the optical disc is attracted by the magnet. Therefore, it is sufficient to use a motor of a small torque. On the contrary, in the unloading mode to eject out the cartridge, the disc is removed from the magnet. Therefore, the operation can be quickly executed by using a motor of a large torque. Further, when the torque is small, the optical disc cannot be unloaded. Therefore, by constructing in a manner such that the voltage which is applied to the load motor can be changed from a firmware such as an MPU or the like and the torque is reduced in the loading mode and the torque is increased in the unloading mode, the operation can be promptly executed and the life of the loading mechanism can be also elongated. However, to enable the voltage that is applied to the motor to be changed from the firmware such as an MPU or the like, there is a problem such that a voltage controlled circuit must be added and the apparatus is complicated and the costs rise.

On the other hand, in the conventional optical disc apparatus in which the recording medium can be exchanged, when the medium such as optical disc, magnetooptic disc, or the like is exchanged by the loading mechanism in a motor stop state, the spindle motor is activated on the basis of a detection signal of the completion of the loading operation. The rotational speed of the spindle motor is raised to a predetermined speed of, for example, 3600 r.p.m. and when the speed reaches the predetermined rotational speed, a light emission adjustment to adjust a laser diode LD of the head, a focusing adjustment to execute a focusing servo by searching and moving an objective lens in a predetermined range, and the like are executed in order to obtain predetermined read power and write power. After completion of the above series of initialization adjusting processes, a ready state in which data can be written or read out is set. However, when the motor speed reaches the predetermined speed after the medium had been exchanged, so long as the series of initialization adjusting processes such as light emission adjustment of the laser diode, focus executing adjustment, and the like are executed and a ready state is subsequently set to thereby enable data to be written or read out, there is a problem such that a processing time in which the initialization processing time has been added to the leading time of the motor rotation is needed and the waiting time until the ready state is long. Therefore, in order to reduce the waiting time until the ready state in which data can be written or read out after the medium was exchanged as short as possible, the present inventors et al. have proposed an optical disc apparatus which executes the initialization control such as light emission adjustment of the laser diode, executing adjustment of the focusing servo, and the like during the raising operation of the motor rotational speed (JP-A-3-104020).

In the conventional disc apparatus, however, in the initialization adjusting processes which are executed during the raising operation of the motor rotational speed, there is a case where a voice coil motor is simultaneously driven to move the head. Therefore, in addition to a control current of the spindle motor, a control current of the voice coil motor flows. When the spindle motor and the voice coil motor are simultaneously driven, fairly large currents respectively flow when they are seen from the whole apparatus. For instance, in case of the optical disc of 5 inches, the peak current reaches up to about 5 A. Thus, there are problems such that the peak value of the current consumption of the whole optical disc apparatus increases and it is necessary to use a power source of a large current capacity and the use of such a large power source obstructs the realization of a small size and low costs.

SUMMARY OF THE INVENTION

According to the invention, a disc apparatus which can properly control a drive torque of a load motor without adding a new circuit, particularly, an optical disc apparatus is provided. First, the invention has a cartridge loading/unloading mechanism. The cartridge loading/unloading mechanism executes the loading operation such that the optical disc enclosed in the cartridge which has been inserted from the outside is attached to the rotary shaft of the spindle motor. The cartridge loading/unloading mechanism also performs the unloading operation such that the optical disc is removed from the rotary shaft of the spindle motor and the cartridge is ejected out to the outside. The invention is characterized in that torque control means for turning on or off the drive current of the load motor at a short period and adjusting the drive torque is provided for such an optical disc apparatus. The torque control means is constructed by: processing means for comprising a firmware such as an MPU or the like to indicate the ON time and OFF time of the motor drive current; and switching means for switching the current which is supplied to the load motor on the basis of instructions of the ON and OFF times from the processing means. The torque control means can be realized by the same hardware as that in the conventional apparatus and there is no need to add a new circuit. The torque control means adjusts the torque by a duty control based on the pulse width modulation (PWM) of the motor current. The torque of the load motor is reduced in the loading mode and is increased in the unloading mode. In the loading mode, it is desirable to change the torque step by step in a manner such that the torque is set to be large at the initial stage and is gradually decreased. In the unloading mode as well, the torque is similarly changed step by step in a manner such that the torque is set to be large at the first stage and is gradually decreased. In the duty control, a duty ratio can be changed at a constant period or can be also changed at variable periods. Further, when the loading or unloading operation is abnormally finished, the drive torque of the load motor is forcedly increased and the loading or unloading operation is again executed.

According to the optical disc apparatus of the invention as mentioned above, even when the voltage which is applied to the load motor is constant, so long as the voltage which is applied to the motor is duty controlled by the pulse width modulation (PWM) by the instructions of the short ON and OFF times from the firmware such as an MPU or the like, the torque of the load motor can be properly controlled by merely changing the firmware without newly adding any circuit.

According to the invention, there is also provided a disc apparatus, particularly, an optical disc apparatus which can limit the peak value of the current consumption upon execution of the initialization adjusting processes for the rising period of time of the motor rotational speed. The optical disc apparatus of the invention which limits the motor current at the time of the initializing adjustment comprises: a spindle motor (first motor) to rotate an optical disc; a voice coil motor (second motor) to position an optical head; a first motor control section to control the spindle motor; a second motor control section to control the second motor; a disc control section for controlling in a manner such that the spindle motor is activated by the first motor control section at the start of the use, the voice coil motor is driven by the second motor control section when a rotational speed of the optical disc reaches a predetermined rotational speed, and the optical head is moved to a desired position of the optical disc, thereby enabling information to be written or read out; an initialization control section to execute a predetermined initializing adjustment for a rising period of time of the motor rotation from a time point of the activation of the spindle motor to a time point when the spindle motor reaches a predetermined speed. According to the present invention, such an optical disc apparatus is provided with a motor drive limiting section to limit a drive current of the spindle motor when the voice coil motor is driven simultaneously with the spindle motor during the execution of the initializing adjustment by the initialization control section. Now, in the motor drive limitation, the drive current of the spindle motor can be limited by either one of the following five methods.

I. The drive current of the spindle motor is set to zero.
II. The drive current of the spindle motor is reduced to a predetermined value and the spindle motor is driven.
III. In case of controlling the motor drive current by the duty ratio, the maximum duty ratio is limited to a predetermined value.
IV. In case of feedback controlling the motor drive current, a detecting sensitivity of the current detection signal indicative of the motor rotational speed is raised and the detection signal indicative of the current which is higher than the actual level is fed back.
V. In case of feedback controlling the motor drive current, a coefficient of 1 or more is multiplied to the current detection signal indicative of the motor rotational speed and the current detection signal is converted into the detection signal indicative of the current which is higher than the actual level and the converted detection signal is fed back.

On the other hand, in the actual initialization control, after the spindle motor was activated, the motor speed is accelerated to a first specific rotational speed (2700 r.p.m.), and after the constant speed control was performed at the first specific rotational speed for a predetermined time, the motor speed is accelerated to a second specific rotational speed (5400 r.p.m.) higher than the first specific rotational speed, and after that, the constant speed control to maintain the second specific rotational speed is executed. During the acceleration control to the first specific speed, by driving the voice coil motor, the optical head is moved to an innermost medium information region out of the user region of the optical disc, thereby allowing the information which has previously been recorded in the medium information region to be read during the constant speed control at the first specific rotational speed. The light emission is adjusted so as to obtain the write power at which an output of the laser diode was read during the acceleration control to the second specific rotational speed. After the light emission was adjusted, the optical head is moved to the user region by driving the voice coil motor. Therefore, the drive current of the spindle motor is limited when the optical head is moved to the medium information region by the driving of the voice coil motor and when the optical head is moved from the medium information region to the user region.

According to such a disk apparatus of the invention as mentioned above, when the exchangeable optical disc cartridge is loaded, the spindle motor is activated, and the initialization adjusting processes are executed during the rising period of time of the motor rotation from a time point when the speed of the spindle motor has reached the predetermined rotation to a time point when information can be written or read out. When the voice coil motor is also simultaneously driven during the execution of the initializing process, the spindle motor is, for example, turned off and the drive currents of two motors simultaneously don't flow as they are. Therefore, the peak value of the current consumption of the apparatus can be limited. There is no need to use a power source of a large current capacity. The size and costs of the apparatus can be reduced. For example, in the optical disc apparatus using an exchangeable 5-inch disc cassette, a peak current of about 5 A is consumed in the conventional apparatus in which the spindle motor and the voice coil motor are simultaneously driven in the initialization adjusting processes during the rising period of time of the motor rotation. However, a peak current according to the invention can be suppressed to about 3.5 A, which value is 70% or lower than that in the conventional apparatus.

The above and other objects, features, and advantages of the present invention will become more apparent from the following detailed description with reference to the drawings.

BRIEF DESCRIPTION OF THE DRAWINGS

FIG. 10 is a circuit diagram showing a load motor drive circuit in FIG. 1;

DETAILED DESCRIPTION OF THE PREFERRED EMBODIMENT

Figure 1:
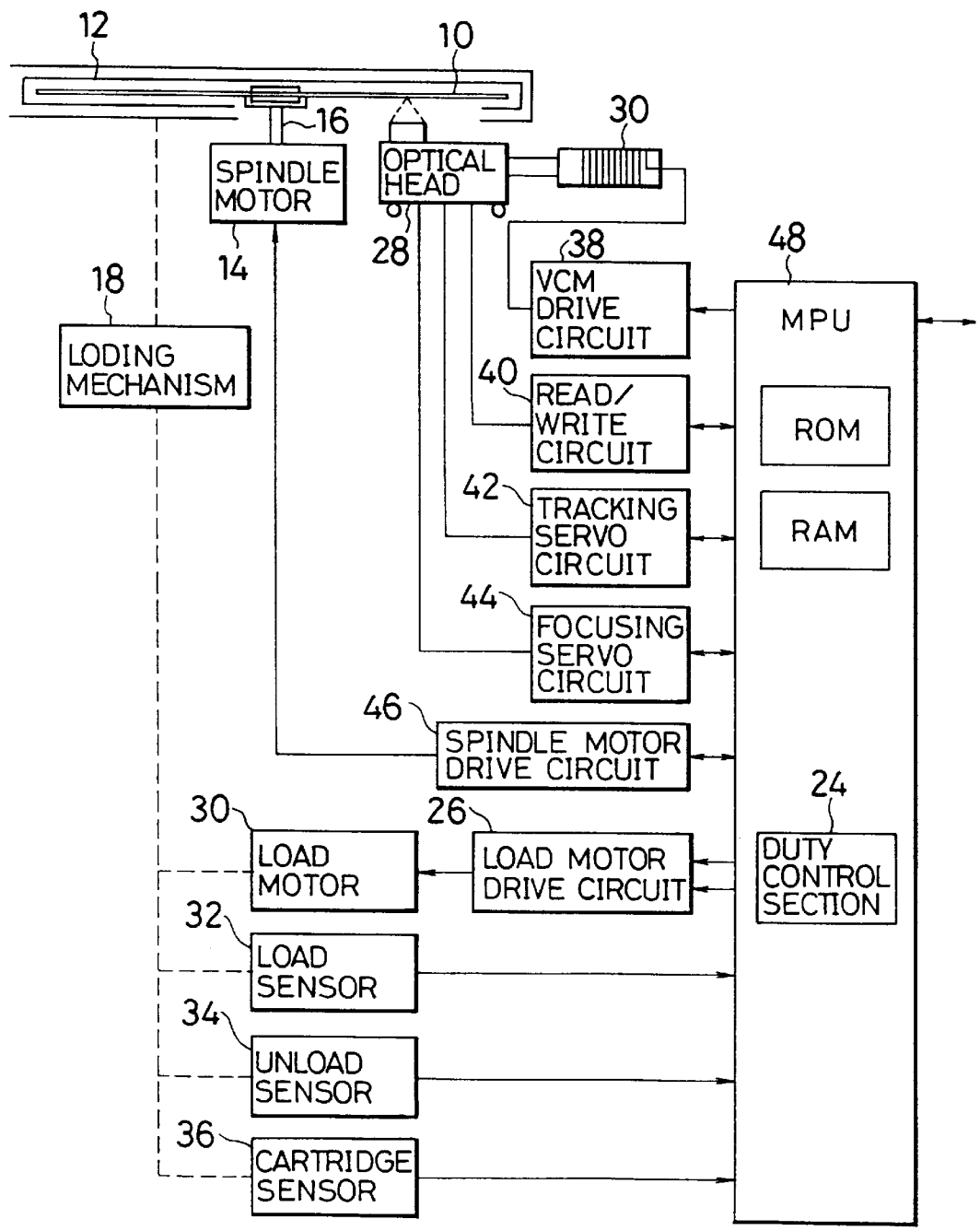
FIG. 1 is a block diagram showing an embodiment of the present invention in which a loading mechanism is controlled.

FIG. 1 shows an embodiment regarding the control of a loading mechanism of the invention. An optical disc cartridge of 5 inches based on the ISO standard will now be described as an example. When a cartridge casing 12 in which an optical disc 10 has been enclosed is inserted into an optical disc apparatus, the cartridge casing 12 is subjected to the loading operation such that it is attached to a rotary shaft 16 of a spindle motor 14 by a loading mechanism 18. The loading mechanism 18 is driven by a load motor 20. When the cartridge casing 12 is in a loading state shown in the diagram, the writing, reading, and erasing operations can be executed to the medium surface of the optical disc 10 by a laser beam from an optical head 28. The optical head 28 is driven in the radial direction of the optical disc 10 by a voice coil motor 30. In addition to the load motor 20, a load sensor 32, an unload sensor 34, and a cartridge-in sensor 36 are provided for the loading mechanism 18. The load sensor 32 generates a detection signal when the cartridge casing 12 is loaded into the state shown in the diagram by the driving of the loading mechanism 18 by the load motor 20. The unload sensor 34 generates a detection signal in an unloading state in which the cartridge casing 12 is removed from the rotary shaft 16 of the spindle motor 14 through the loading mechanism 18 by the reverse driving of the load motor 20. Further, when the cartridge casing 12 is inserted at a loading possible position to the rotary shaft 16 of the spindle motor 14, the cartridge-in sensor 36 operates and generates a detection signal. The load motor 20 is driven by a load motor drive circuit 26. The load motor drive circuit 26 receives an on/off signal from a duty control section 24 as torque control means which is realized by a program control of an MPU 48 and controls a drive current flowing in the load motor 20. Further, the MPU 48 is provided with: a VCM (voice coil motor) drive circuit 38; a read/write circuit 40; a tracking servo circuit 42; a focusing servo circuit 44; and a spindle motor drive circuit 46. The VCM drive circuit 38 drives the voice coil motor 30 by a control signal from the MPU 48 and controls the position of the optical head 28 to the optical disc 10. The read/write circuit 40 supplies the read signal which has been read from the optical disc 10 by the optical head 28 to the MPU 48. On the basis of a write signal from the MPU 48, the read/write circuit 40 controls a write beam by the driving of a laser diode of the optical head 28 and writes information to the medium 10. On the basis of a tracking error signal which is derived from the optical head 28, the tracking servo circuit 42 allows the beam to trace a spiral track formed on the medium surface of the optical disc 10. On the spiral track, a kick-back operation such that the beam is returned to the original position every rotation of the disc is executed. The focusing servo circuit 44 performs a focusing control of an objective lens provided for the optical head 28. Further, the spindle motor drive circuit 46 is activated after completion of the loading operation of the optical disc 10 enclosed in the cartridge casing 12 to the rotary shaft 16, thereby rotating the optical disc 10 at a constant speed.

Figure 2:
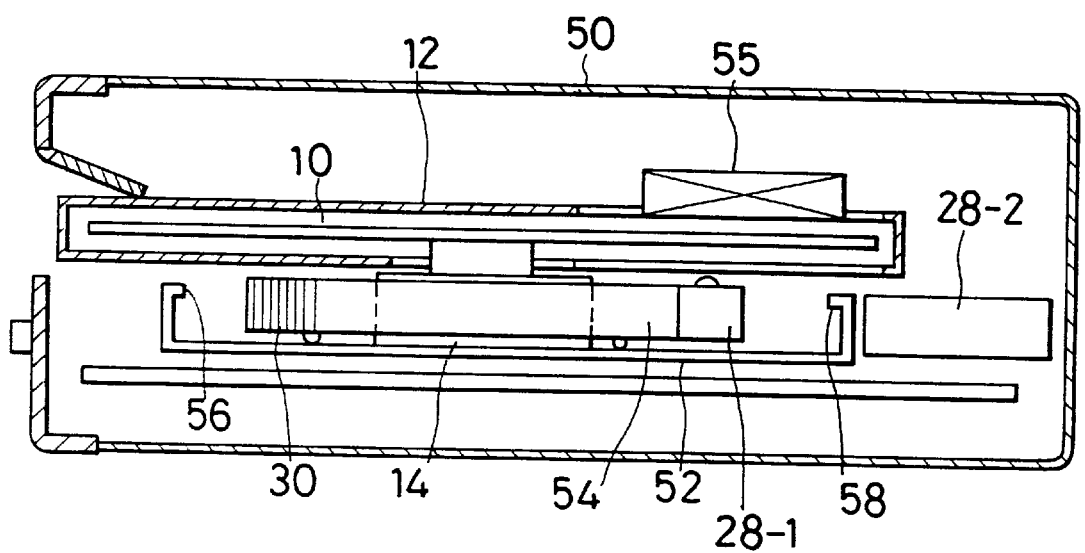
FIG. 2 is an explanatory diagram showing an internal structure of an optical disc apparatus of the invention.

FIG. 2 shows an example of an internal structure of the optical disc apparatus of the invention. A supporting frame 52 is provided in a casing 50 of the apparatus. The spindle motor 14 is arranged on the supporting frame 52. The optical disc 10 enclosed in the loaded cartridge casing 12 is chucked to the rotary shaft of the spindle motor 14. In the loading state, the upper and lower positions corresponding to the optical head of the optical disc 10 are opened by the operation of the shutter. An external magnet 55 is located to a position over the opening position. An optical head movable portion 28-1 is located to a position below the opening position. The optical head movable portion 28-1 is fixed to the right side of a box-shaped movable frame 54 whose inside is hollowed. A coil of the voice coil motor 30 is attached to the left side of the movable frame 54. The movable frame 54 can be moved on the supporting frame 52 by rollers. An inner rim stopper 56 is formed on the left side of the supporting frame 52 and an outer rim stopper 58 is formed on the right side. An optical head fixing portion 28-2 is arranged at a position on the right side of the supporting frame 52. The laser diode and its optical system are assembled in the optical head fixing portion 28-2. The laser beam enters into or goes out from the optical head movable portion 28-1 supported to the movable frame 54.

Figure 3:
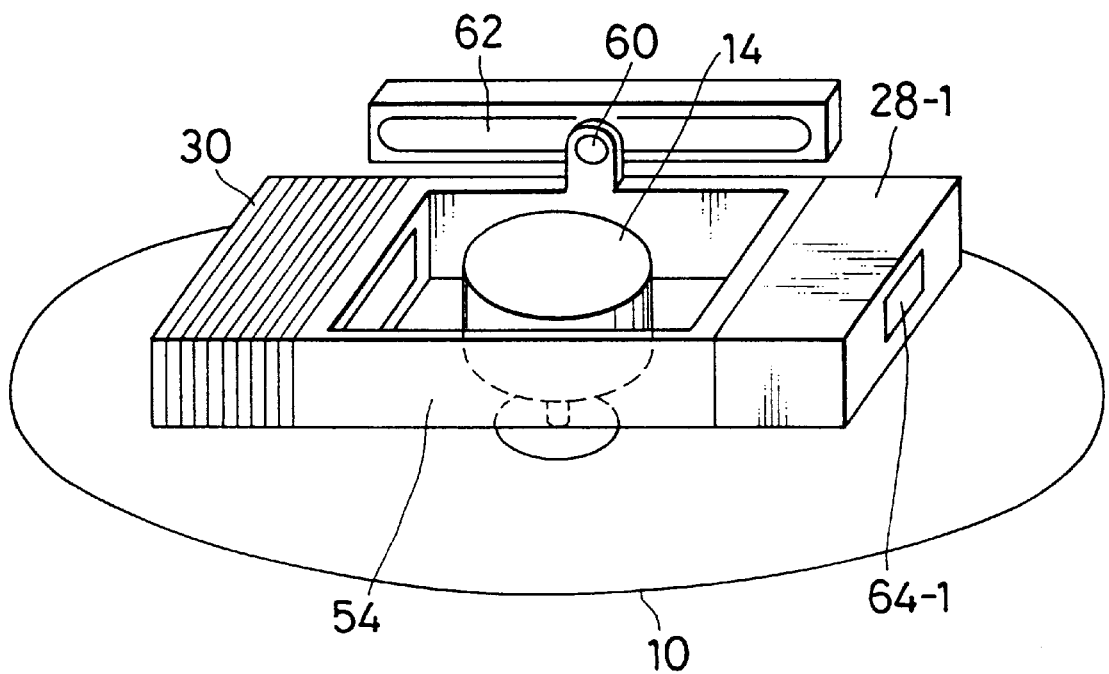
FIG. 3 is an explanatory diagram showing a movable frame in FIG. 2 when it is shown from the lower side.

FIG. 3 shows the portion of the movable frame 54 in FIG. 2 when it is seen from the back side. The movable frame 54 is a box-shaped member in which the inside is hollowed. The spindle motor 14 is arranged in such a hollow portion. The optical head movable portion 28-1 having an incident/outgoing window 64-1 is fixed to one end of the movable frame. A coil of the voice coil motor 30 is arranged on the opposite side. Further, an LED 60 is arranged at a projecting position of the side edge of the lower portion of the movable frame 54. A position sensing detector 62 as a one-dimensional optical sensor is arranged at the position on the fixed side which faces the LED 60. The LED 60 emits a light emission beam onto the position sensing detector 62. The detector 62 generates a light reception output corresponding to the position of the movable frame 54.

Figure 4:
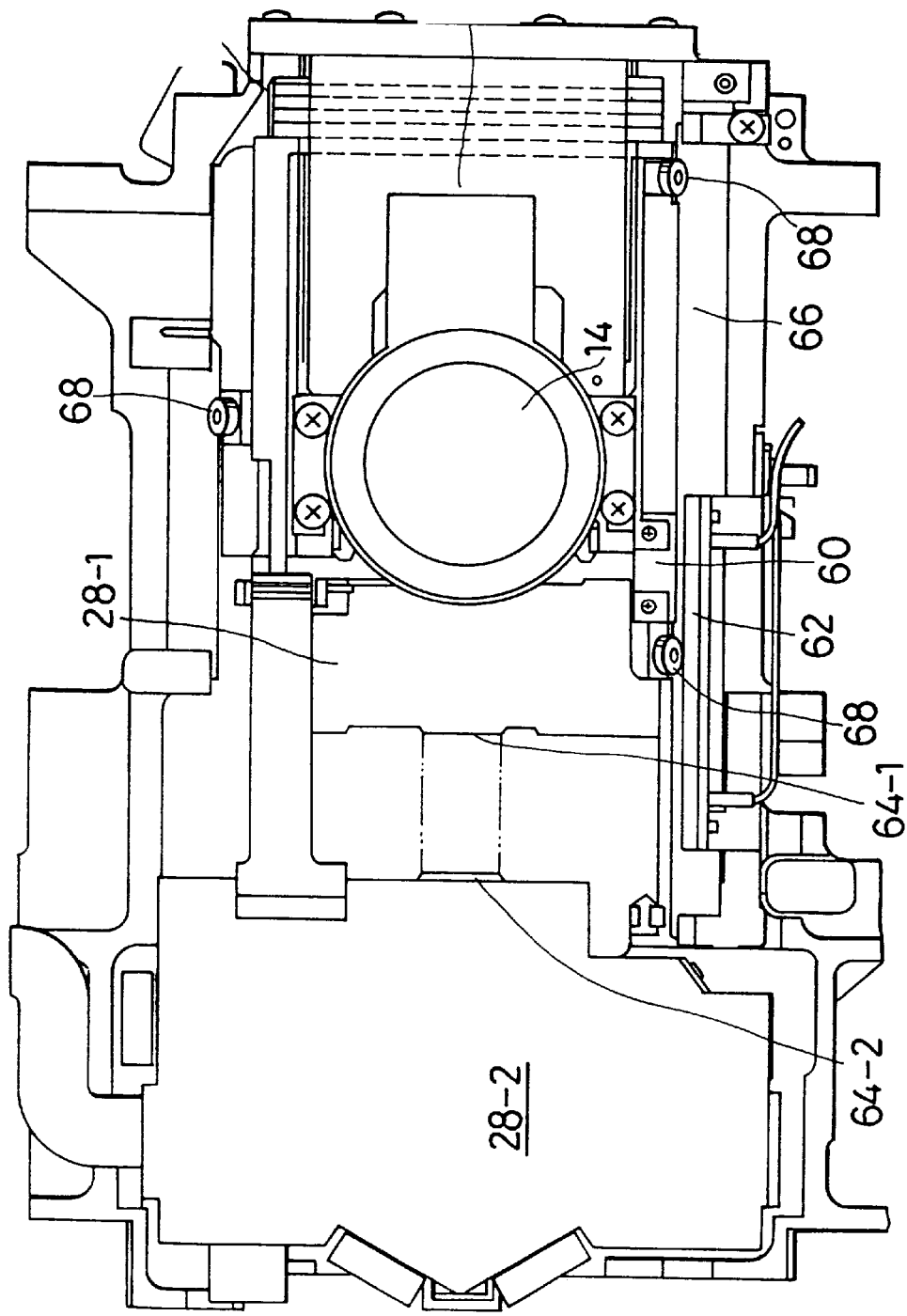
FIG. 4 is a bottom view of FIG. 2.

FIG. 4 shows an internal structure of FIG. 2 when it is seen from the bottom surface side. The movable frame 54 is mounted on a rail 66 on the supporting frame side so as to be movable by a roller 68. The optical head movable portion 28-1 is arranged on the left side of the movable frame 54 so as to face the optical head fixing portion 28-2, thereby allowing incident/outgoing windows 64-1 and 64-2 to always face each other irrespective of the moving position of the movable frame 54. The coil of the voice coil motor 30 is arranged at the right edge of the movable frame 54. The external magnet 55 is arranged on the upper side of the coil. Further, the LED 60 is arranged in the movable frame 54. The LED 60 irradiates the laser beam to the position sensing detector 62 on the fixed side, thereby enabling a position signal of the movable frame 54, namely, the optical head movable portion 28-1 to be detected.

Figure 5:
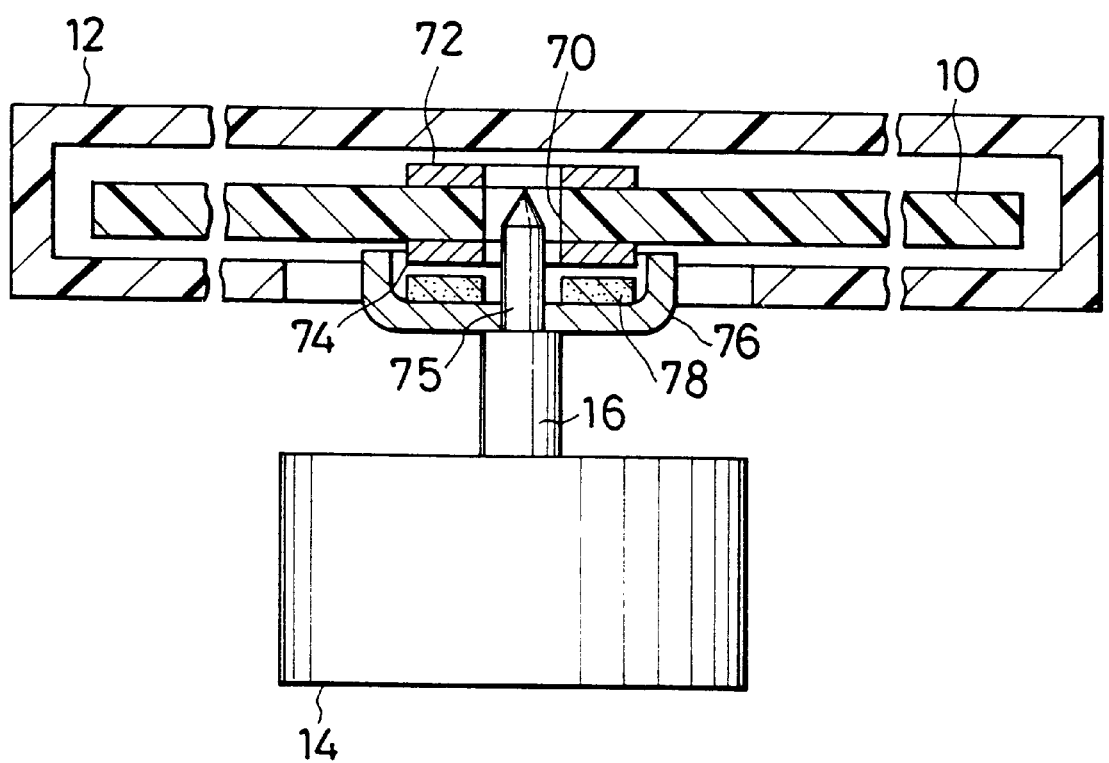
FIG. 5 is an explanatory diagram of a chucking structure of an optical disc in FIG. 1.

FIG. 5 shows a chukking structure of the optical disc 10 enclosed in the cartridge casing 12 to the rotary shaft 16 of the spindle motor 14 in FIG. 1. An edge of the rotary shaft 16 of the spindle motor 14 forms a pointed center pin 75. A bowl-like disc reception 76 which is curved on the upper side is fixed to the stairway portion of the rotary shaft 16. A magnet 78 is attached into the disc reception 76. On the other hand, the optical disc 10 enclosed in the cartridge casing 12 has a shaft hole 70. Hubs 72 and 74 made of a magnetic metal material are fixedly attached to the upper and lower portions of the shaft hole 70. Therefore, the loading mechanism 18 shown in FIG. 1 executes the loading and unloading operations of the optical disc 10 to/from the rotary shaft 16 of the spindle motor 14 shown in FIG. 5.

Figure 6:
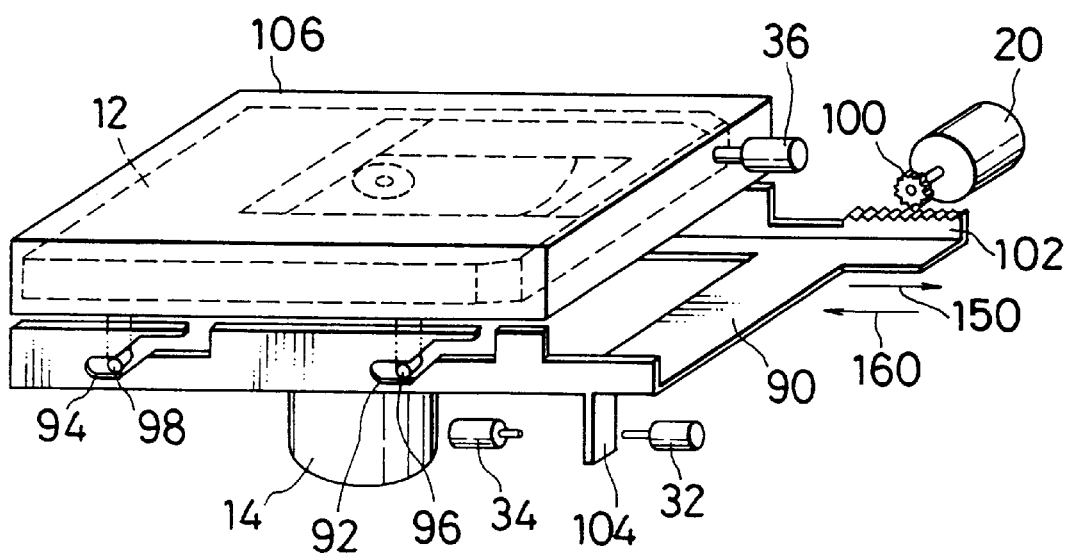
FIG. 6 is an explanatory diagram of the loading mechanism in FIG. 1.

FIG. 6 shows a loading mechanism shown in FIG. 1. A slider member 90 which is slidable in the lateral direction is provided for the loading mechanism 18. A rack gear 102 is formed at one of the corners on the right side of the slider member 90. The load motor 20 in which a pinion gear 100 comes into engagement with the rack gear 102 is provided. Guide grooves 92 and 94 are formed on the side surface of the slider member 90 in a manner such that each groove is opened to the upper portion and is subsequently opened in the lateral direction end is inclined obliquely downwardly and is further opened in the lateral direction. The guide grooves are also similarly formed on the side surface on the forming side of the rack gear 102 of the slider member 90. Hooks 96 and 98 attached to the lower portion of a housing 106 which is opened to the right side are fitted into the guide grooves 92 and 94, respectively. The hooks 96 and 98 are also similarly formed on the forming side of the rack gear 102. Further, a sensor pressing plate 104 is projected to the lower side at the right edge on this side of the slider member 90. The load sensor 32 is arranged on the right side of the sensor pressing plate 104 and the unload sensor 34 is arranged on the opposite side. Further, the cartridge-in sensor 36 is attached to the right edge of the housing 106. A detection pin of the cartridge-in sensor 36 is projected to the inside of the housing 106. As shown by a broken line, the cartridge casing 12 can be enclosed into the housing 106 from the opening portion on the right side. In the enclosing state, a shutter of the cartridge casing 12, which will be explained hereinlater, is opened, thereby exposing the internal optical disc surface.

The loading operation of the optical disc 10 by the loading mechanism 18 is performed by rotating the load motor 20 so as to move the slider member 90 in the direction of an arrow 150. That is, when the pinion gear 100 is rotated by the load motor 20 and the slider member 90 is moved to the right shown by an arrow 150 by the rack gear 102, the hooks 96 and 98 of the housing 106 locating in the upper opening portions of the upper guide grooves 92 and 94 are first downwardly pushed down along the oblique portions of the guide grooves 92 and 94 while keeping their positions due to the movement of the slider member 90 in the right direction. Thus, the shaft hole of the lower portion of the optical disc 10 is fitted to the rotary shaft of the spindle motor 14 and is chucked thereto by the attraction by the magnet, thereby completing the loading operation. On the contrary, the unloading operation is performed by rotating the load motor 20 so as to move the slider member 90 in the opposite direction shown by an arrow 160. When the slider member 90 is moved to the left shown by the arrow 160 from the loading position (not shown), the hooks 96 and 98 are pushed up along the guide grooves 92 and 94. The optical disc 10 which has been chucked to the rotary shaft of the spindle motor 14 is pulled out and removed. The positions of the slider member 90 in the loading and unloading operations as mentioned above are detected by the load sensor 32 and unload sensor 34, respectively, and the load motor 20 is stopped.

Figure 7:
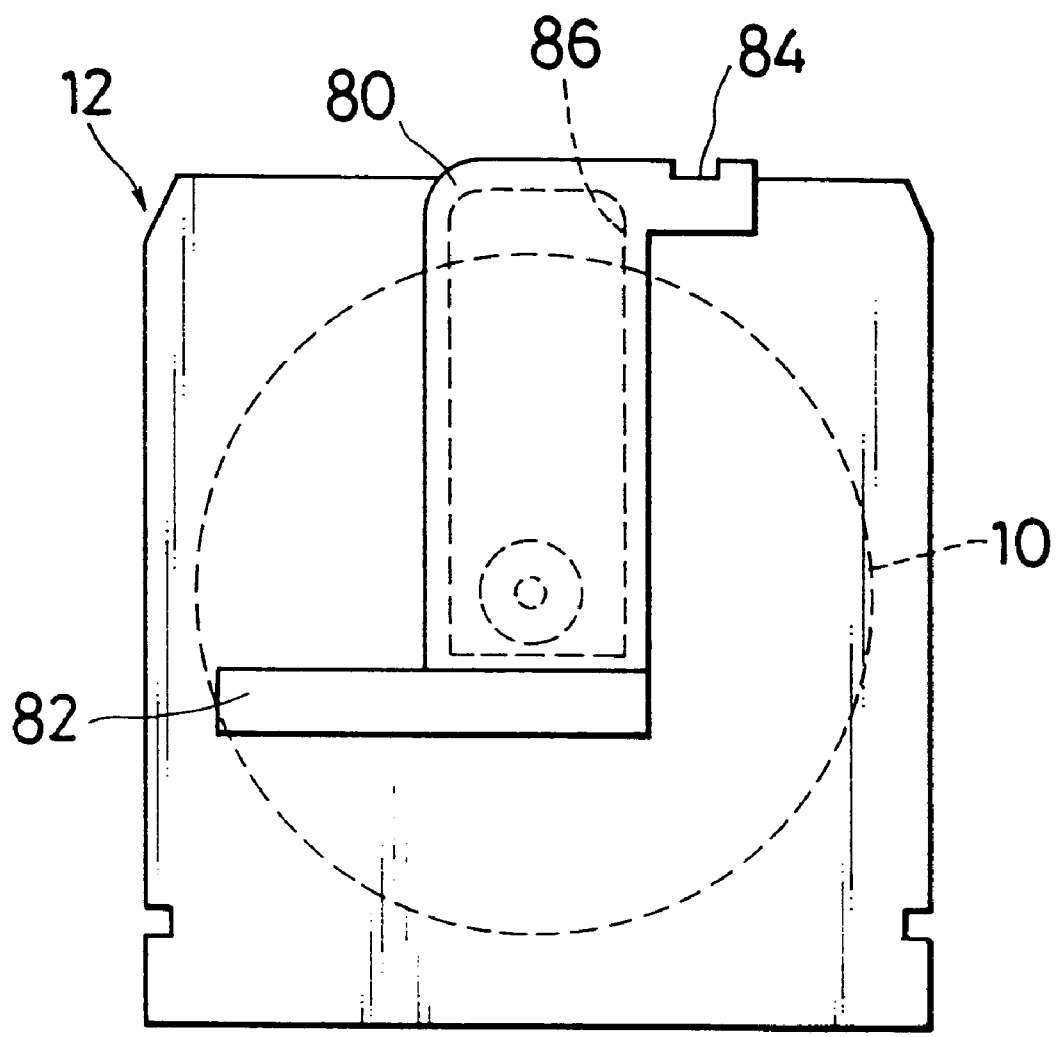
FIG. 7 is an explanatory diagram of an optical disc cartridge which is used in the invention.

FIG. 7 shows the 5-inch disc cartridge based on the ISO standard shown in FIG. 1. As shown by the broken line, the optical disc 10 is enclosed in the cartridge casing 12. A shutter 80 is slidably attached to the surface of the cartridge casing 12 by a shutter pressing plate 82. An opening portion 86 is formed in the shutter 80. The shutter 80 has a notch 84 for the opening operation when it is enclosed into the optical disc apparatus.

Figure 8:
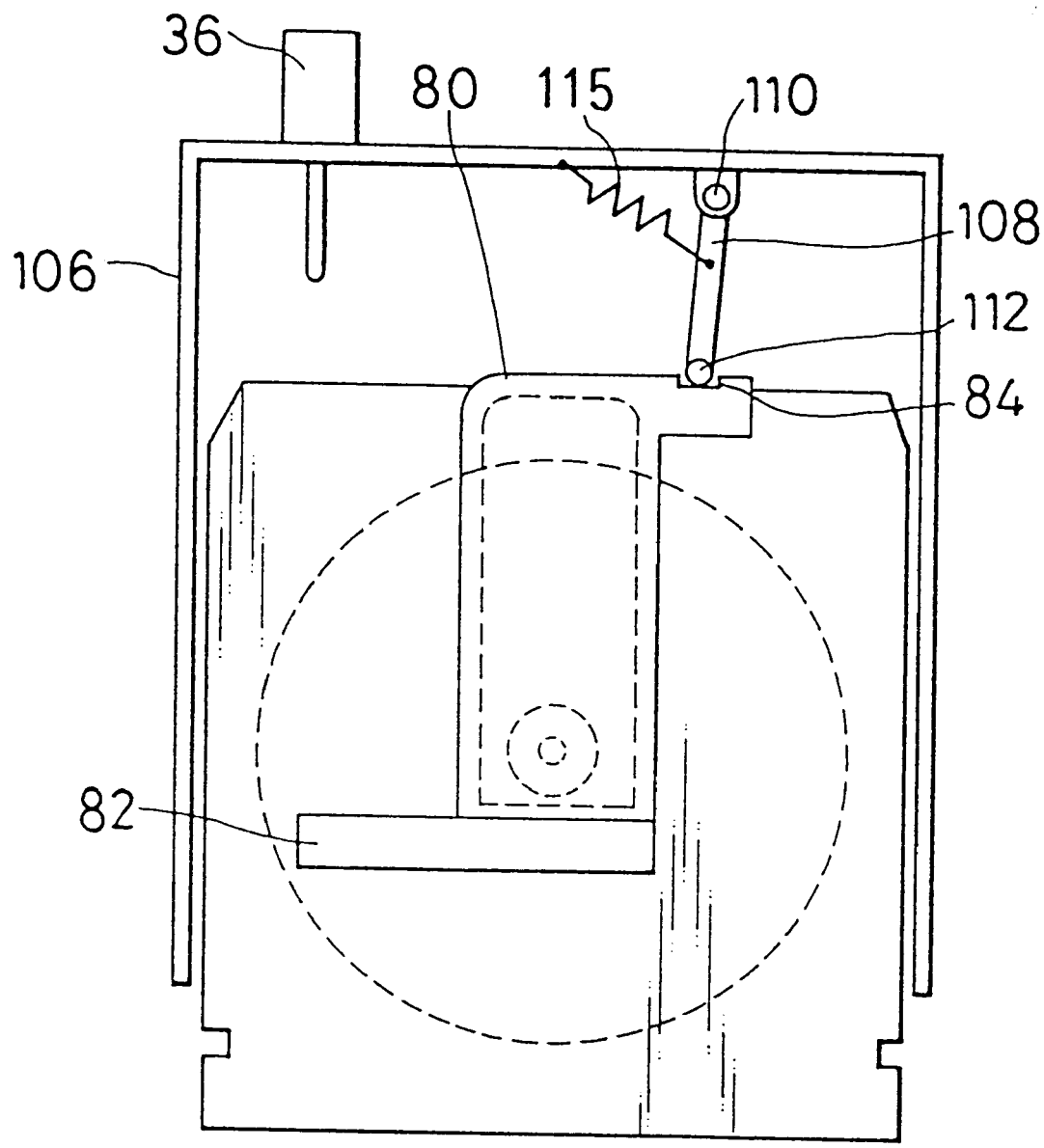
FIG. 8 is an explanatory diagram showing an internal state at the start of insertion of the cartridge.
Figure 9:
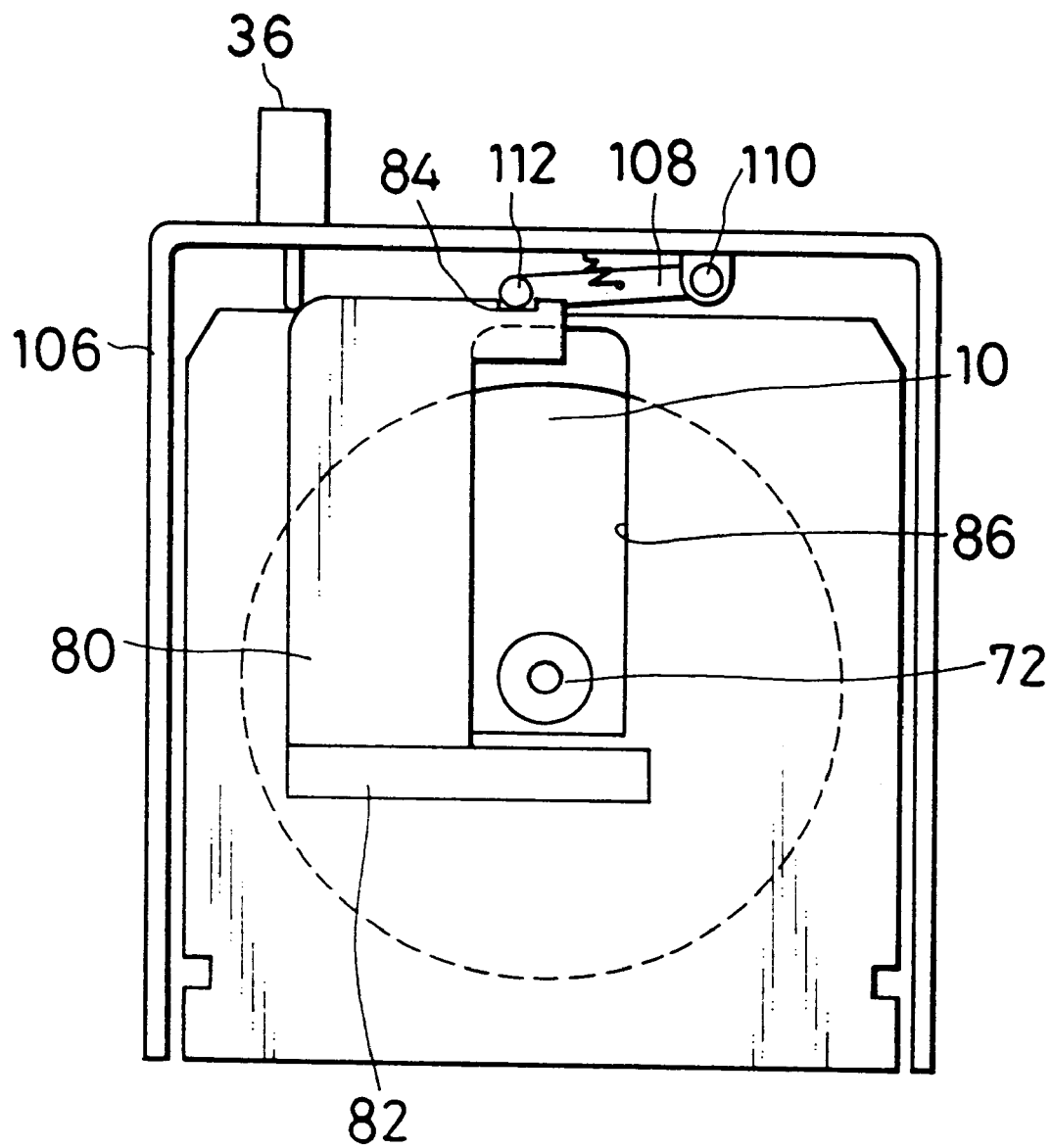
FIG. 9 is an explanatory diagram showing an internal state at the completion of the insertion of the cartridge.

FIG. 8 shows the operation when the cartridge casing 12 in FIG. 7 is inserted into the housing 106 of the optical disc apparatus. FIG. 9 shows a state in which the cartridge casing has completely been inserted. First, as shown in FIG. 8, when the cartridge casing 12 is inserted into the housing 106, the notch 84 of the shutter 80 provided for the cartridge casing 12 is fitted to a pin 112 at the edge of an arm 108 which is attached into the housing 106 so as to be rotatable by a rotary shaft 110. The arm 108 is held at an initial position by an arm return spring 115. When the cartridge casing 12 is further depressed in a state in which the pin 112 of the arm 108 shown in FIG. 8 is in engagement with the notch 84 of the shutter 80, the arm 108 is fallen down as shown in FIG. 9, thereby allowing the shutter 80 to be slided to the left side along the shutter pressing plate 82. The shutter 80 is removed from the position of the opening portion 86, thereby exposing the medium surface of the optical disc 10 and the hub 72 through the opening portion 86. In an insertion completion state of the cartridge casing 12 shown in FIG. 10, the pin of the cartridge-in sensor 36 is depressed and a built-in switch contact is turned on. When a detection signal of the cartridge-in sensor 36 is set to ON, the loading operation of the optical disc 10 by the loading mechanism 18 by the activation of the load motor 20 shown in FIG. 6 is executed.

Figure 10:
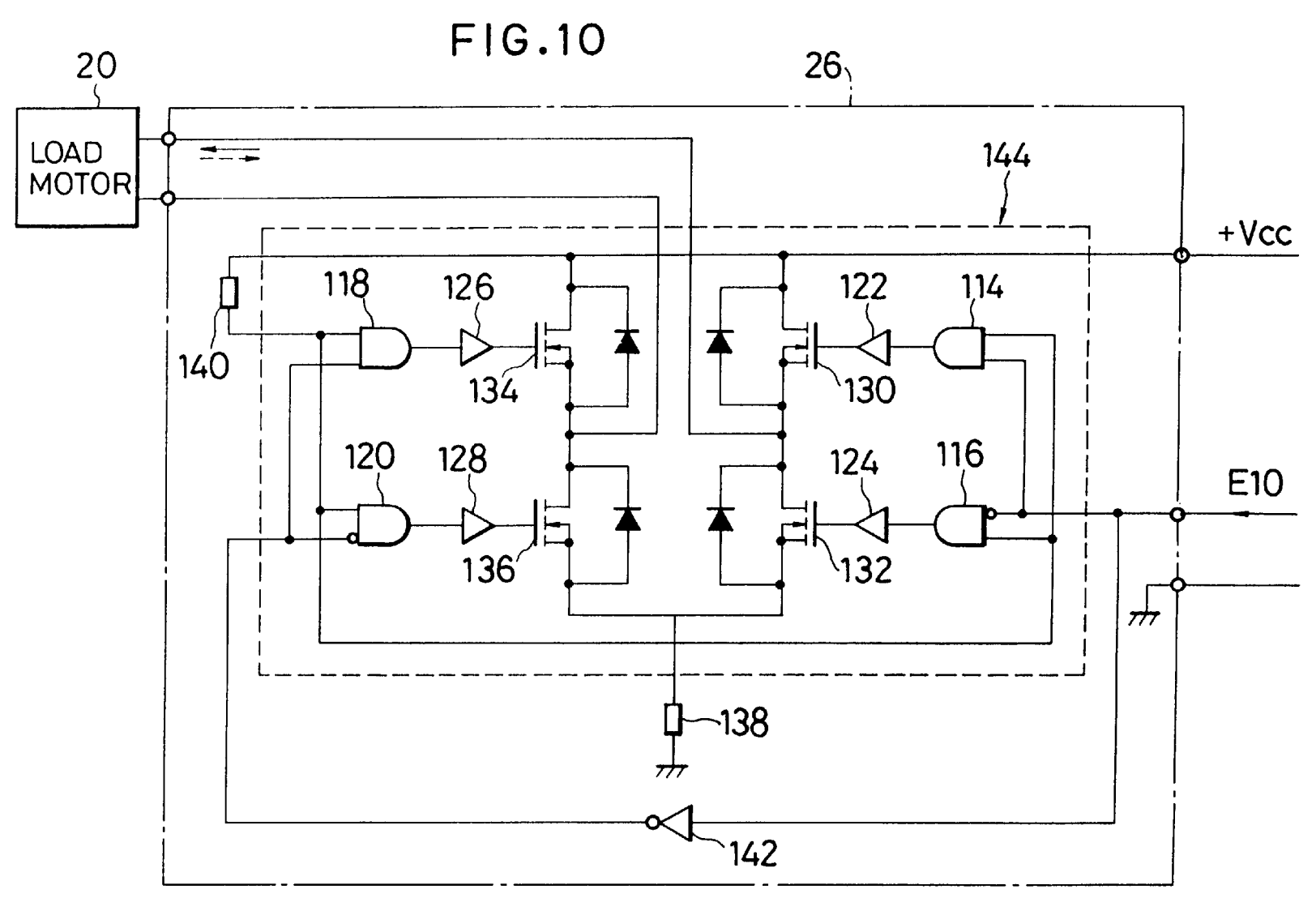

FIG. 10 shows a circuit diagram of the load motor drive circuit 26 shown in the embodiment of FIG. 1. The load motor drive circuit 26 is constructed by: AND gates 114, 116, 118, and 120; drivers 122, 124, 126, and 128; FETs 130, 132, 134, and 136; a resistor 138; a pull-up resistor 140; and an inverter 142. In the load motor drive circuit 26, a circuit section 144 shown by a broken line, for example, "DMOS full bridge driver" which is made by SGS-THOMSON Co., Ltd. and can be purchased by using the ordering No. L6201. A power source voltage $+V_{cc}$ is applied to the load motor drive circuit 26. An on/off signal $E_{10}$ for torque control of the load motor 20 is also given to the load motor drive circuit 26 by the duty control section 24 provided in the MPU 48. When the signal $E_{10}$ is at the H level, outputs of the AND gates 114 and 120 are set to the H level and outputs of the AND gates 116 and 118 are set to the L level. The FETs 130 and 136 are turned on through the drivers 122 and 128, while the FETs 134 and 132 are turned off. Therefore, current to the load motor 20 flows from the FET 130 to the FET 136 as shown by an arrow of a solid line, thereby allowing, for example, loading operaton to be executed. When the signal $E_0$ set to the L level, the AND gates 118 and 116 generate H-level output signals, the AND gates 114 and 120 generate L-level output signals, the FETs 134 and 132 are turned on, and the FETs 130 and 136 are turned off. Therefore, the current flows in the load motor 20 in the direction shown by an arrow of a broken line from the FET 134 to the FET 132. The load motor 20 is reversely rotated, so that the unloading operation can be executed. A diode to absorb a surge is connected in parallel with each of the FETs 130, 132, 134, and 136.

Figure 11:
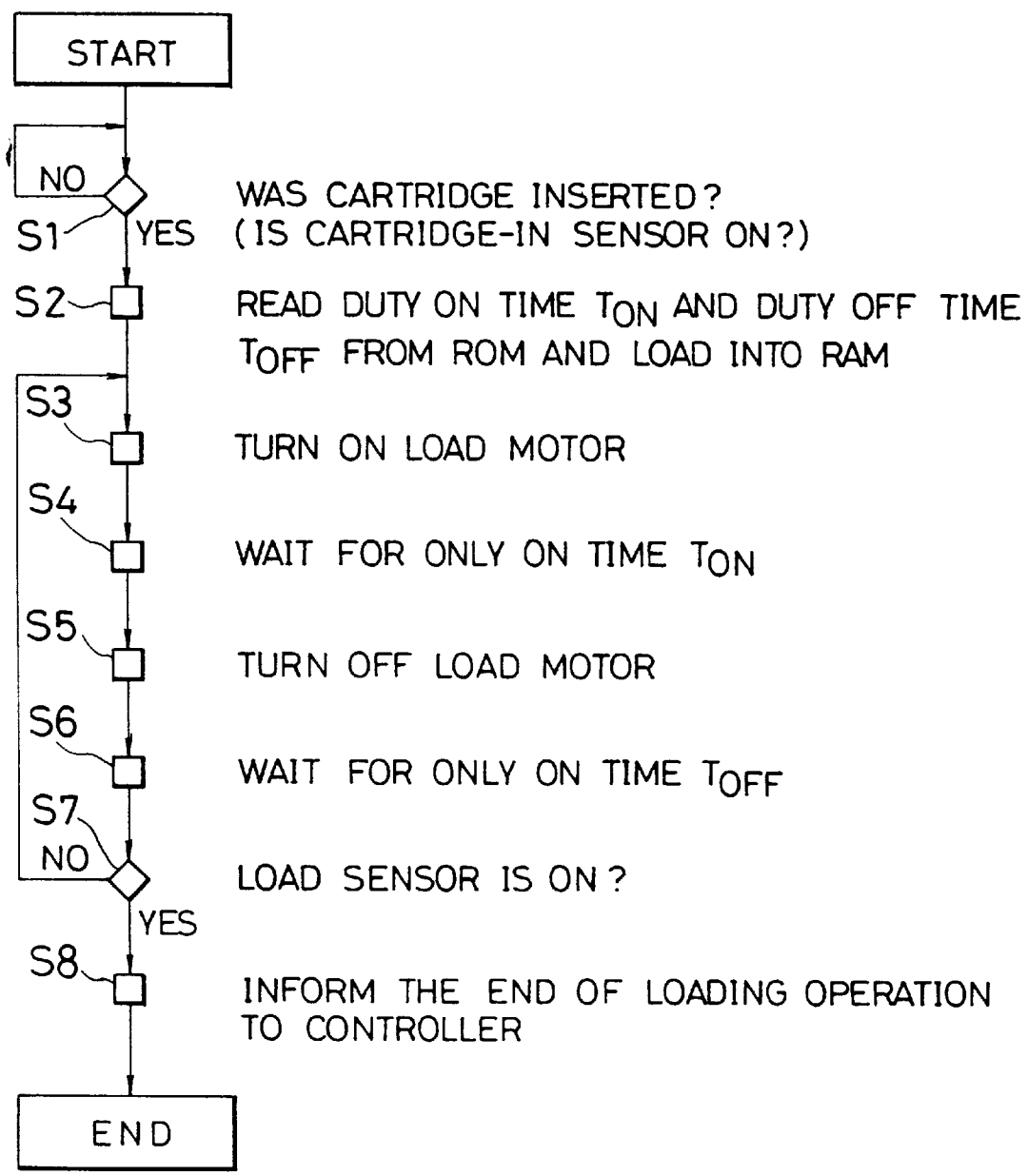
FIG. 11 is a flowchart showing a loading process as applied to a stand-alone apparatus.
Figure 12:
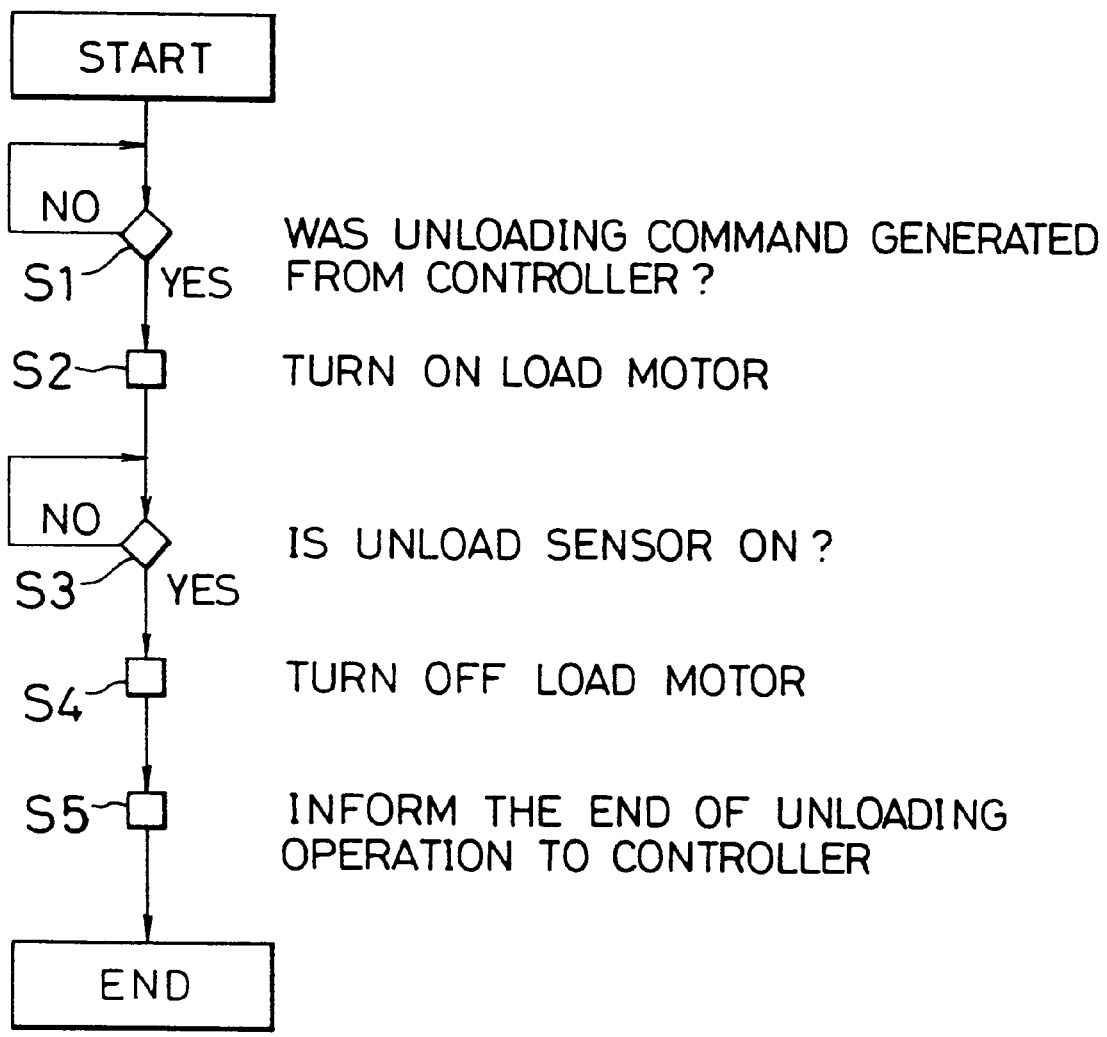
FIG. 12 is a flowchart showing an unloading process as applied to the stand-alone apparatus.

The torque control of the load motor 20 by the duty control section 24 in FIG. 1 will now be described with reference to flowcharts of FIGS. 11 and 12. The flowchart of FIG. 11 shows the loading process in the case where the optical disc apparatus is built in a jukebox or the like and is used as a stand alone apparatus. FIG. 12 shows the unloading process in this instance. The loading process of FIG. 11 is characterized in that the torque control is executed so as to set to the drive torque of the load motor to be smaller than that in the unloading process. In the loading mode, to reduce the drive torque of the load motor 20, a duty ON time $T_{ON}$ and a duty OFF time $T_{OFF}$ which are used in the on/off control of the duty control section 24 have previously been stored in the RAM in the MPU 48.

In FIG. 11, a check is first made in step S1 to see if the cartridge has been inserted or not. Practically speaking, a check is made to see if the cartridge-in sensor 36 has been turned on or not. When the insertion of the cartridge is decided, step S2 follows and the duty ON time $T_{ON}$ and duty OFF time $T_{OFF}$ are read out from the ROM and are stored into the RAM. Subsequently, a voltage polarity is decided so as to drive the load motor 20 in the loading direction and the load motor is ON driven. In step S6, the apparatus waits for only the ON time $T_{ON}$ stored in the RAM. After the elapse of the ON time $T_{ON}$, the driving of the load motor 20 is turned off in step S5. The apparatus waits for only the OFF time $T_{OFF}$ stored in the RAM in the next step S6. Each time the above processes in steps S3 to S6, a check is made in step S7 to see if the load sensor 32 has been turned on or not. The ON driving of the load motor for the ON time $T_{ON}$ and the OFF driving for the OFF time $T_{OFF}$ are repeated until the load sensor 32 is turned on. The load motor 20 is consequently subjected to the PWM control by the duty ratio of $T_{ON}/(T_{ON}+T_{OFF})$. Since the drive current averagely decreases by only a ratio that is determined by the duty ratio as compared with that in the case where the load motor 20 has been continuously ON driven, the drive torque can be reduced. The load sensor 32 is turned on by such an unloading operation in which the drive torque is small. When the completion of the loading operation is discriminated due to the turn-on of the load sensor 32, such a fact is informed to the controller in step S8 and the above series of processes are finished. After that, the reading/writing processes for the loaded optical disc are started.

FIG. 12 shows the unloading process to eject out the cartridge after the loading operation in FIG. 11 was performed. First, in step S1, a check is made to see if an unloading command has been generated from the controller or not. If YES, the load motor 20 is ON driven in step S2. Since the unloading operation is executed by a large drive torque, the load motor 20 is intermittently ON driven. In step S3, whether the unload sensor 34 has been turned on or not is discriminated. If YES, the driving of the load motor 20 is turned off in step S4. In step S5, the completion of the unloading operation is informed to the controller, thereby mechanically ejecting out the optical disc cartridge.

Figure 13:
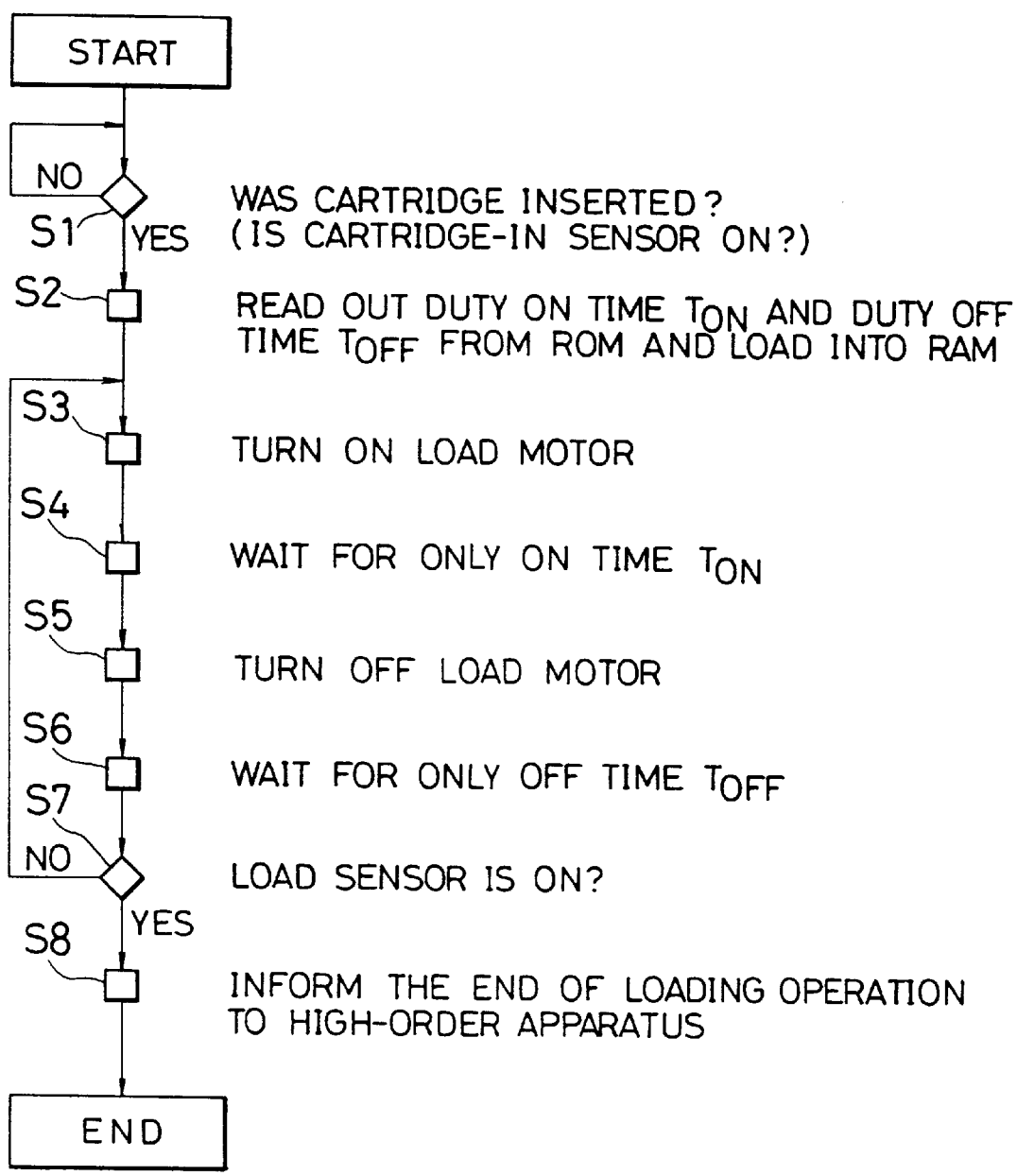
FIG. 13 is a flowchart showing a loading process as applied to a library apparatus.

FIG. 13 is a flowchart showing another embodiment of the torque control of the load motor 20 by the duty control section 24 in FIG. 1. In another embodiment, FIG. 13 shows the loading process in the case where the optical disc apparatus is used as a library apparatus for a high-order apparatus such as a computer main body or the like. Further, in the unloading process of FIG. 14, since a large torque is needed when the optical disc which is in an attracting state by the magnet is removed, the load motor 20 is driven so as to initially obtain a large torque in the unloading process. After the optical disc is removed, the drive torque is reduced and the load motor 20 is driven.

First, the loading process as a library apparatus is fundamentally the same as the loading process as applyied to the stand alone apparatus shown in FIG. 11 except that the end of the loading operation is informed to the high-order apparatus in the final step S8. The other remaining processes are the same as those in FIG. 11. That is, even in the loading process as a library apparatus, by repeating the ON driving and OFF driving of the load motor 20 for a short time interval, the drive torque is reduced by the PWM control.

The unloading process in which the drive torque is reduced step by step will now be described with reference to FIG. 14. To execute the unloading process, first, duty ON times $T_{ON1}$ and $T_{ON2}$ and duty OFF times $T_{OFF1}$ and $T_{OFF2}$ to drive the load motor by a large torque and a small torque have previously been stored in the ROM in the MPU 48 in FIG. 1. Now, assuming that a period of time T of the ON and OFF times is constant, the duty ON times and duty OFF times are set so as to satisfy the following relations.

$T_{ON1} > T_{ON2}$ $T_{OFF1} < T_{OFF2}$

Further, $C_1$ has previously been registered as a count value to judge a count value of a timer counter C to switch the torque.

Figure 14:
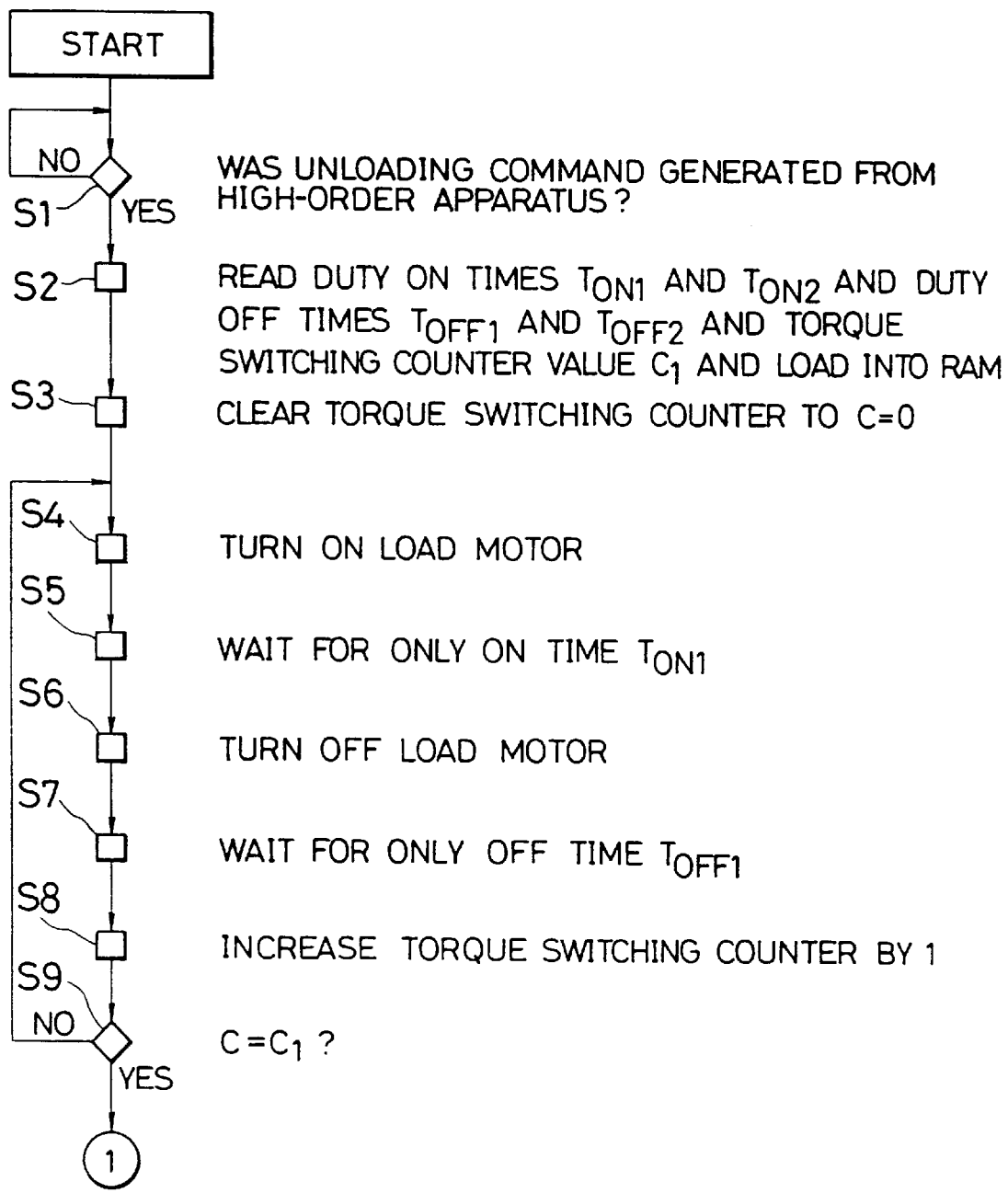
FIG. 14 is a flowchart showing an unloading process as applied to the library apparatus.

In FIG. 14, first, a check is made in step S1 to see if the unloading command has been generated from the high-order apparatus or not. If YES, step S2 follows and the duty ON times $T_{ON1}$ and $T_{ON2}$, duty times $T_{OFF1}$ and $T_{OFF2}$, and torque switching count value $C_1$ are read out from the ROM and stored into the RAM.

In the next step S3, the count value of the torque switching counter C to detect a torque switching timing is cleared to C=0. In step S4, the load motor 20 is ON driven. In step S5, the apparatus waits for only the ON time $T_{ON1}$ to decide the drive torque at the first stage. In step S6, the driving of the load motor 20 is turned off. In step S7, the apparatus waits for only the OFF time $T_{OFF1}$. After completion of the on/off operations of the load motor 20, the value of the torque switching counter C is increased by "1" in step S8. In step S9, a check is made to see if the count value has reached the torque switching counter value $C_1$ or not. The on/off operations of the load motor 20 for the time $T_{ON1}$ and time $T_{OFF1}$ in steps S4 to S8 are repeated until the count value of the torque switching counter C reaches $C_1$. When C reaches $C_1$ in step S9, it is decided that the torque switching timing has come. The processing routine advances to step S10 in FIG. 15. The load motor 20 is ON driven in step S10. In step S11, the apparatus waits for only the ON time $T_{ON2}$ in order to execute the torque driving at the second stage. In step S12, the driving of the load motor is switched to OFF. After that, in step S13, the apparatus waits for only the OFF time $T_{OFF2}$. In step S14, a check is made to see if the unload sensor 34 has been turned on or not. By repeating the on/off control to obtain the drive torque at the second stage of the load motor 20, namely, a small drive torque in steps S10 to S13, when the unload sensor 34 is turned on, step S15 follows and the end of the unloading operation is informed to the high-order apparatus.

Figure 15:
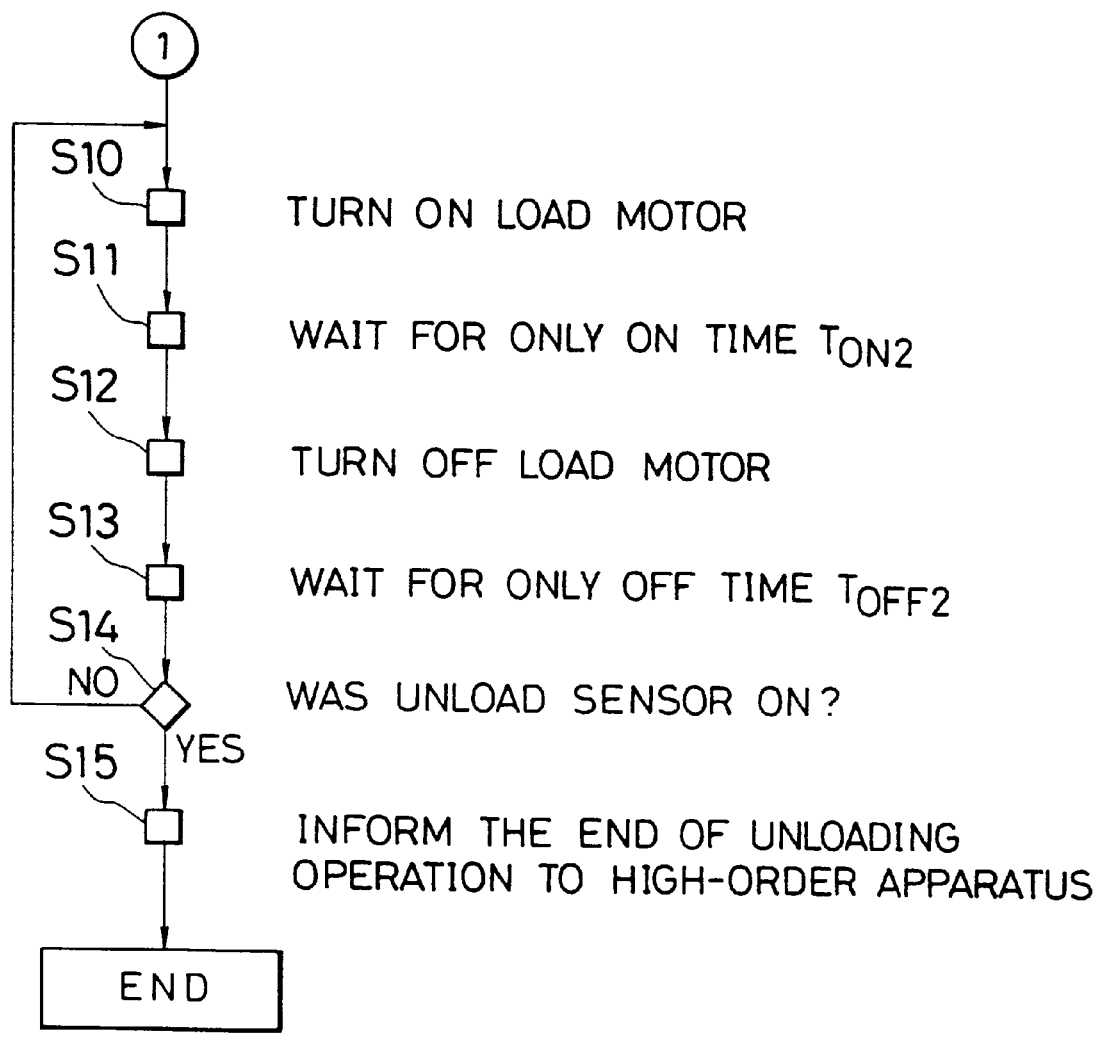
FIG. 15 is a flowchart showing an unloading process as applied to the library apparatus.

Although the flowcharts of FIGS. 11 and 12 relate to the examples of the loading process and unloading process in the stand-alone apparatus, the invention can be also similarly applied to the library apparatus. With respect to the above point, the unloading process in case of the library apparatus of FIGS. 14 and 15 can be also similarly applied to the stand alone apparatus. As for the duty control such that the load motor 20 is alternately controlled for short ON and OFF times in the above embodiment, a duty control such that the ON and OFF times are changed at predetermined periods of time or a duty control such that the ON and OFF times are changed at irregular periods of time. Further, in the above embodiment, as shown in the flowcharts of FIGS. 14 and 15, the control has been made in a manner such that the drive torque is first set to a large value in only the unloading operation and that the drive torque is reduced after the optical disc was removed from the attracting force of the magnet. With respect to the loading operation as well, it is also possible to control in a manner such that the drive torque is first set to a large value and the optical disc is allowed to approach the magnet and that when the attracting force by the magnet is generated, the drive torque is reduced.

Further, for example, when the loading operation fails and is abnormally finished by the torque control upon loading, it is determined that the drive torque is insufficient, so that the duty control is executed so as to increase the drive torque of the load motor than that in the preceding control and the loading operation is again executed. As for the retry due to an increase in drive torque of the unload motor when the loading operation fails and is abnormally finished, even in the case where the removing operation of the optical disc fails in the unloading operation and the unloading operation is abnormally finished, it is also possible to retry by similarly increasing the drive torque.

Figure 16:
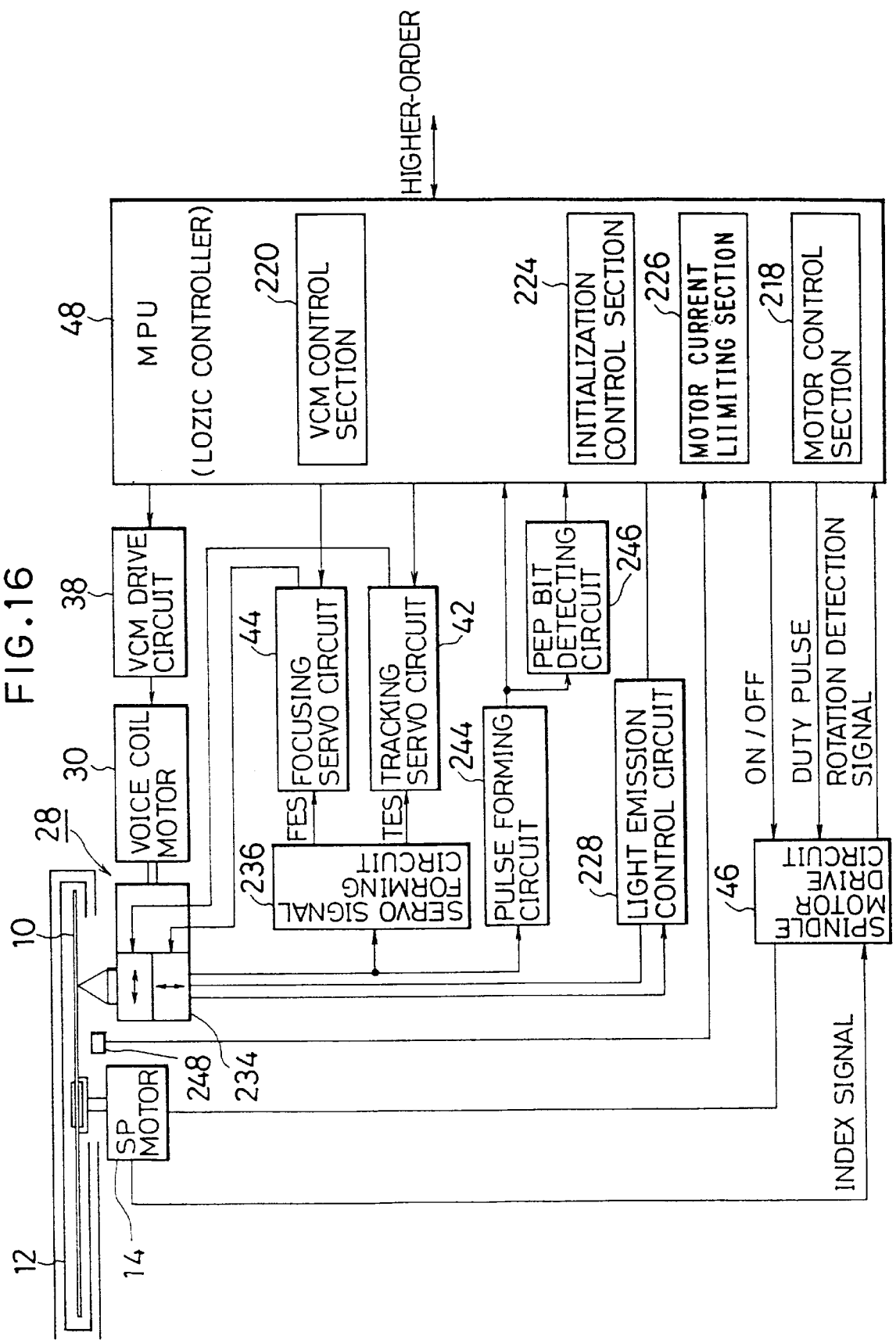
FIG. 16 is a block diagram showing an embodiment of the invention in which a motor current is limited in an initializing process.

FIG. 16 shows an embodiment of an optical disc apparatus of the invention in which the motor current is limited in the initializing process. In this embodiment, as an optical disc 10, for example, an optical disc cartridge in which a standard 5-inch optical disc based on the ISO standard has been enclosed is used. When the cartridge casing 12 in which the optical disc 10 has been enclosed is set into the optical disc apparatus, it is attached to the rotary shaft of the spindle motor 14 by the same loading mechanism (not shown) as the loading mechanism shown in the embodiment of FIG. 1. The spindle motor 14 is controlled through the spindle motor drive circuit 46 by a motor control section 218 which is realized by the program control of the MPU 48. That is, the spindle motor 14 is stopped in the loading state of the optical disc 10. When the loading operation of the optical disc 10 is finished, a motor ON signal is supplied to the spindle motor drive circuit 46 from the motor control section 218 provided in the MPU 48 which functions as a logic controller, so that the spindle motor 14 is activated. As a spindle motor 14, for example, a brushless DC motor is used. A rotational speed of the motor is raised to a predetermined rotational speed, for example, 5400 r.p.m. and when it reaches 5400 r.p.m., the constant speed control is executed. Specifically speaking, a reference clock signal which gives a rotating period of 5400 r.p.m. is compared with an index signal to detect the actual rotation of the spindle motor 14. The motor drive current is PWM controlled so as to set the delay or advance of an index signal for the reference signal to zero.

Figure 17:
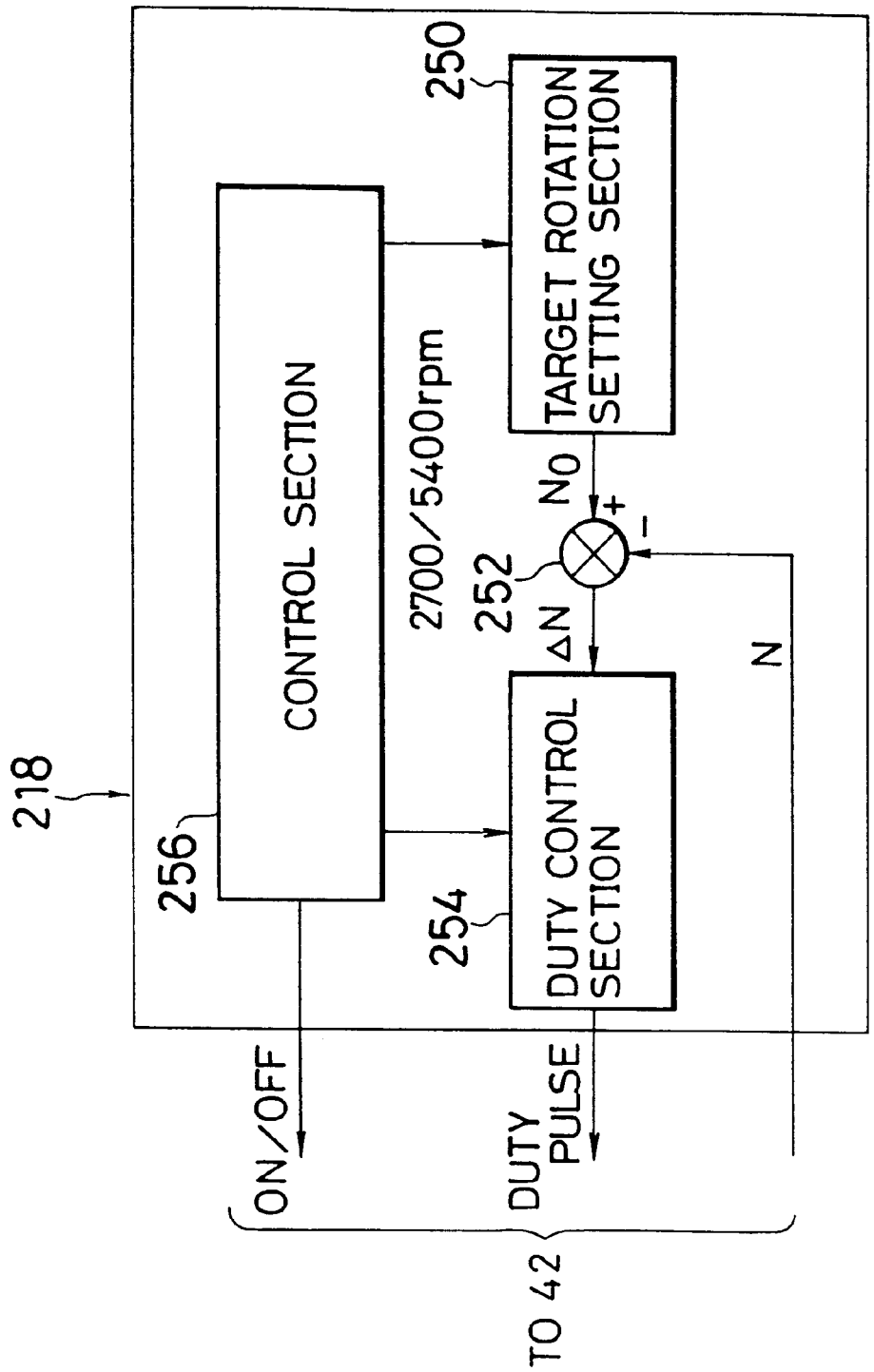
FIG. 17 is a block diagram showing a motor control section in FIG. 16.

FIG. 17 shows an embodiment of the motor control section 218 in FIG. 16. The motor control section 218 is constructed by a target rotational speed setting section 250, an addition point 252, a duty control section 254, and a control section 256. The target rotational speed setting section 250 sets a target rotational speed $N_0$ indicative of, for instance, 5400 r.p.m. to the addition point 252 as a target rotational speed. A deviation $\Delta N$ between the target rotational speed $N_0$ and a rotational detection signal N indicative of the actual rotation of the spindle motor 14 is taken out. The deviation $\Delta N$ obtained at the addition point 252 is given to a duty control section 254. A duty ratio of the motor drive current is controlled so as to set the deviation $\Delta N$ to 0. That is, when the deviation $\Delta N$ has a plus value, the ON duty of the motor drive current is reduced and the total motor drive current is reduced, thereby decreasing the rotational speed. When the deviation $\Delta N$ has a minus value, the ON duty of the motor drive current is increased and the total motor drive current is increased, thereby raising the rotational speed. As a target rotational speed $N_0$ in FIG. 17, as mentioned above, it is sufficient to use a reference clock signal which gives the rotating period of the predetermined rotational speed of 5400 r.p.m. and, as a rotation detection signal N, it is sufficient to use an index signal to detect the actual rotation of the spindle motor 14.

Referring again to FIG. 16, the optical head 28 is provided for the optical disc 10. The optical head 28 is mounted on a carriage and is moved in the radial direction of the optical disc 10 by the voice coil motor 30. Further, a tracking actuator 232 and a focusing actuator 234 are mounted on the optical head 28. The tracking actuator 232 can be moved in the radial direction in a range of a width of a predetermined number of tracks. The focusing actuator 234 moves an objective lens in the direction of the optical axis. The objective lens irradiates the beam spot to the disc surface. The focusing actuator 234 performs a focusing control to a specific micro spot on the disc surface so as to form an image. The voice coil motor 30 is controlled through the voice coil motor drive circuit 38 by a voice coil motor control section 220 provided in the MPU 48. A read signal from the optical head 28 is given to a servo signal forming circuit 236, by which a focusing error signal FES and a tracking error signal TES are formed. The focusing error signal FES is supplied to a focusing servo circuit 230 and the focusing actuator 234 is driven so as to minimize the focusing error signal FES. The tracking error signal TES is supplied to a tracking servo circuit 238 and the tracking actuator 232 is driven so as to minimize the tracking error signal TES. Each of the focusing servo circuit 230 and the tracking servo circuit 238 is made operative or non-operative by the MPU 48, namely, on/off controlled. Further, a laser diode is provided for the optical head 28. A power of laser diode is controlled by a light emission control circuit 228 so as to obtain a different light emission amount in each of the writing mode, erasing mode, and reading mode. The light emission amount of the laser diode is detected by a photodiode or the like provided for the optical head 28 and is fed back to the light emission control circuit 228. The light emission control circuit 228 controls the drive current of the laser diode so as to minimize a difference between the preset target light emission amount and the detection light emission amount. Further, the read signal read out from the optical head 28 is supplied to a pulse forming circuit 244. Since the input signal is an analog signal, it is converted into the digital signal. A read pulse obtained from the pulse forming circuit is supplied to the MPU 48 and the read data is demodulated. A PEP bit detecting circuit 246 is provided at the output stage of the pulse forming circuit 244. Each data in the reading, writing, and erasing modes which is used for the adjustment of the light emission of the laser diode is stored into a phase encoded part zone (hereinafter, referred to as a PEP zone) as a medium information region of the optical disc 10. The PEP one is read in a constant speed rotating state in which the rotational speed is held for a predetermined time to a predetermined rotational speed of, e.g., 2700 r.p.m. as a half of the final specific rotational speed of 5400 r.p.m. during the rising time of the motor rotation. On the basis of the data for light emission adjustment obtained from the PEP read data, the light emission of the laser diode is adjusted.

Figure 18:
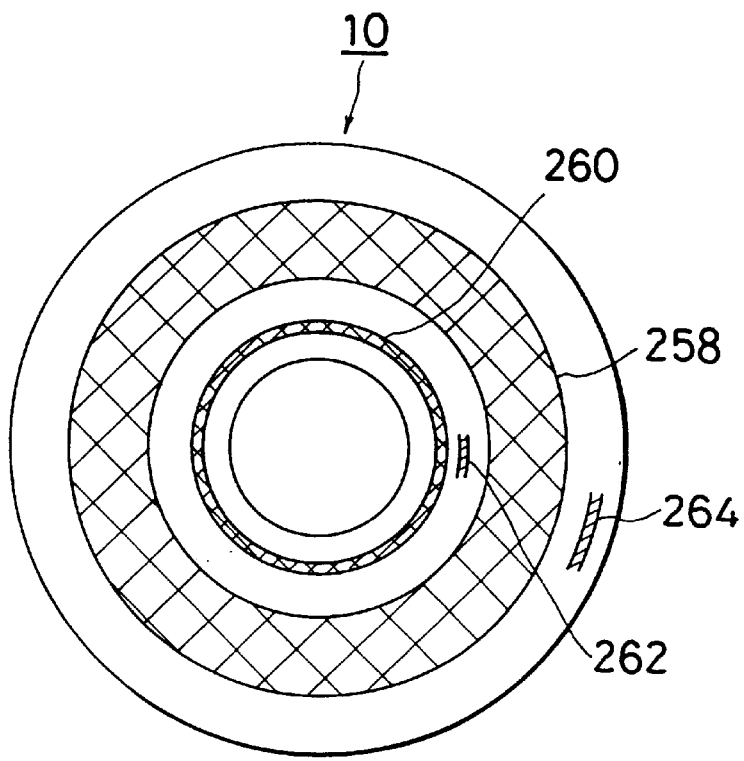
FIG. 18 is an explanatory diagram of a recording region of an optical disc.
Figure 19:
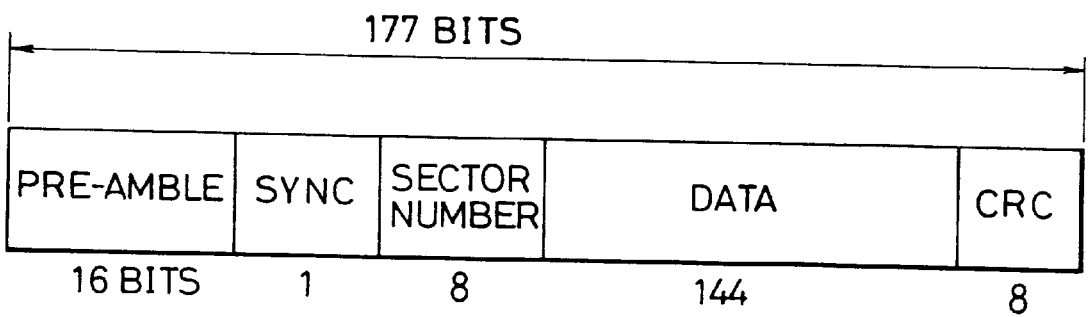
FIG. 19 is an explanatory diagram of a sector format of a PEP zone in FIG. 18.
Figure 20:
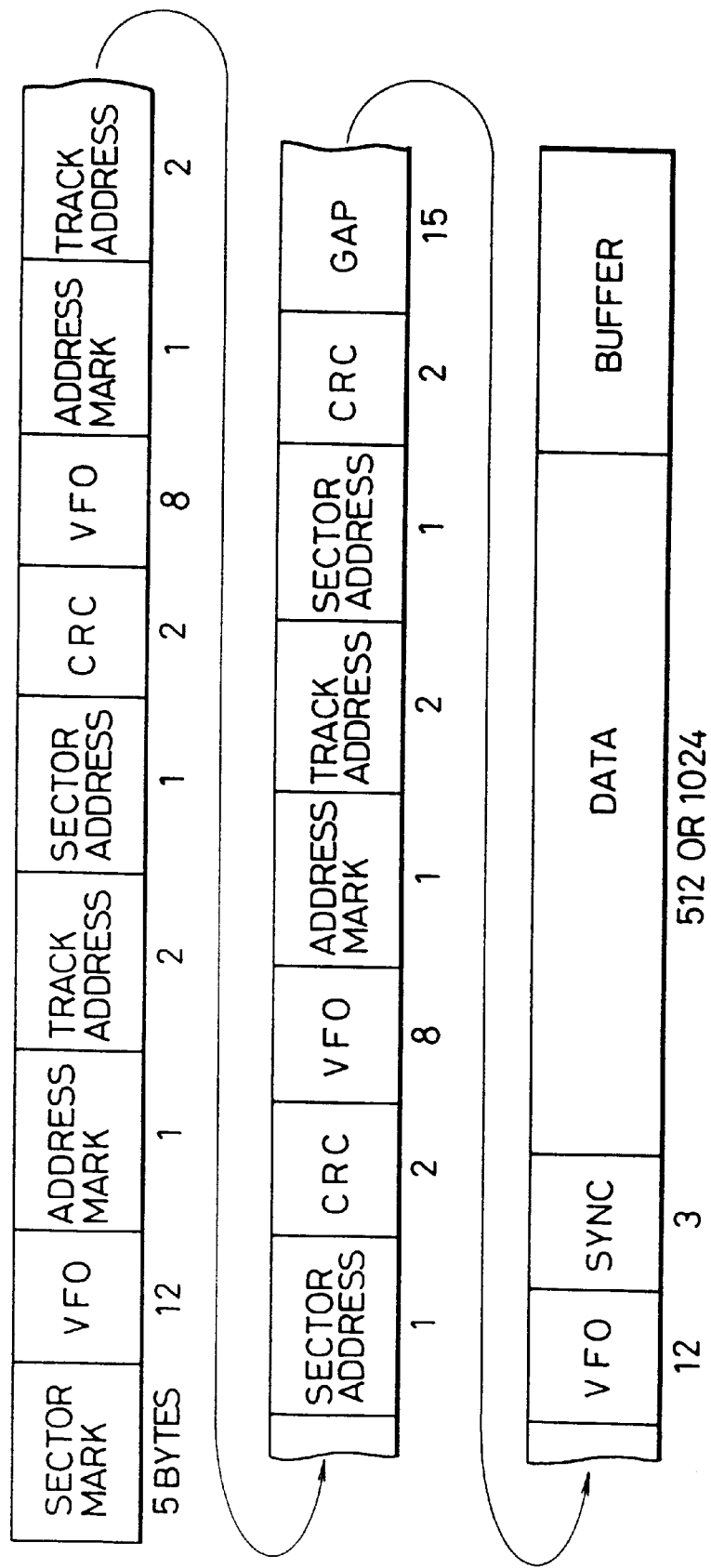
FIG. 20 is an explanatory diagram of a sector format of a user zone in FIG. 18.

FIG. 18 shows a recording region of the optical disc having the PEP zone. A user zone 258 is provided for the optical disc 10. A spiral track is formed in the user zone 258. A PEP zone 260 is formed on the inside of the user zone 258. Further, two standard formated part zone (hereinafter, referred to as an SFP zone) 262 and 264 are provided between the user zone 258 and the PEP zone 260 and on the outside of the user zone 258. The SFP zone 264 is read when the inside SFP zone 262 cannot be read. When the optical disc 10 is loaded into the disc apparatus, the PEP zone 260 is first read. The SFP zone 262 is subsequently read. Finally, the user zone 258 is accessed. When the SFP zone 262 cannot be read, the outside SFP zone 264 is read. Information necessary to read the SFP zones 262 and 264 and the user zone 258, for example, the format of the optical disc, modulating method, the number of bytes of the user data in one sector, the maximum limit values of the read power when the SFP zones 262 and 264 are read, and the like have been recorded in the PEP zone 260. On the other hand, information which is necessary for the writing and reading operations of the user zone 258 has been recorded in the SFP zones 262 and 264. The maximum limit values of the read power, write power, and erase power which are necessary for the writing and reading operations of the user zone 258 have been recorded in the SFP zones 262 and 264. Further, in the PEP zone 260, a reading operation of the phase modulation data by the MPU 48 at the rotational speed of 2700 r.p.m. corresponding to the half of the specific rotational speed of 5400 r.p.m. in the ordinary accessing operation is presumed. Therefore, as shown in the SFP zones 262 and 264 in FIG. 19 and the user zone 258 in FIG. 20, sector formats differ and data is recorded by quite different modulating methods. Thus, the read data in the PEP zone 260 and the user zone 258 and the SFP zones 262 and 264 cannot be analyzed by the same circuit. As shown in FIG. 16, the special PEP bit detecting circuit 246 to analyze the read data in the PEP zone 260 is provided.

Referring again to FIG. 16, an inner sensor 248 is provided on the inner side of the optical disc 10. The inner sensor 248 detects the movement of the optical head 28 to the PEP zone 260 shown in FIG. 18. That is, the voice coil motor control section 220 of the MPU 48 drives the voice coil motor 30 until a detection signal of the inner sensor 248 is obtained when the disc apparatus is activated, thereby moving the optical head 28 to the inner side. When the optical head 28 is stopped at a detecting position of the inner sensor 248, the optical head can read the PEP zone 260. Since each of the PEP zone 260 and SFP zones 262 and 264 is not a spiral track like the user zone 258 but is a circular track having a width of 500 μm. Therefore, the tracking control (kicking operation) in the reading mode is unnecessary.

Further, an initialization control section 224 and a motor current limiting section 226 are provided as functions which are realized by the program control for the MPU 48. The initialization control section 224 performs initialization adjustments such as light emission adjustment of the laser diode provided for the optical head 28, focus executing adjustment, and the like for a period of time until the spindle motor 14 is raised to the predetermined rotational speed of 5400 r.p.m. after the optical disc 10 had been loaded and the spindle motor 14 was activated. In the initialization adjustments, in order to read the PEP zone of the optical disc 10, when the rotational speed of the spindle motor reaches 2700 r.p.m., the control mode is switched to the constant speed control mode. Therefore, the acceleration control of the spindle motor 14 is executed at two stages. Further, the initialization control section 224 drives the voice coil motor 30 in order to move the optical head 28 to the PEP zone of the optical disc 10. After the PEP zone was read, the voice coil motor 30 is driven to return the optical head 28 from the PEP zone to the user zone. That is, the voice coil motor 30 is driven twice during the initialization adjustment. During the control by the initialization control section 224, when the voice coil motor 30 is simultaneously driven, the motor current limiting section 226 limits the driving of the spindle motor 14. Specifically speaking, the ON signal to the spindle motor drive circuit 46 of the spindle motor 14 is switched to OFF just before the voice coil motor 30 is driven. The drive current of the spindle motor 14 is set to zero for a period of time during which the voice coil motor 30 is driven.

Figure 21:
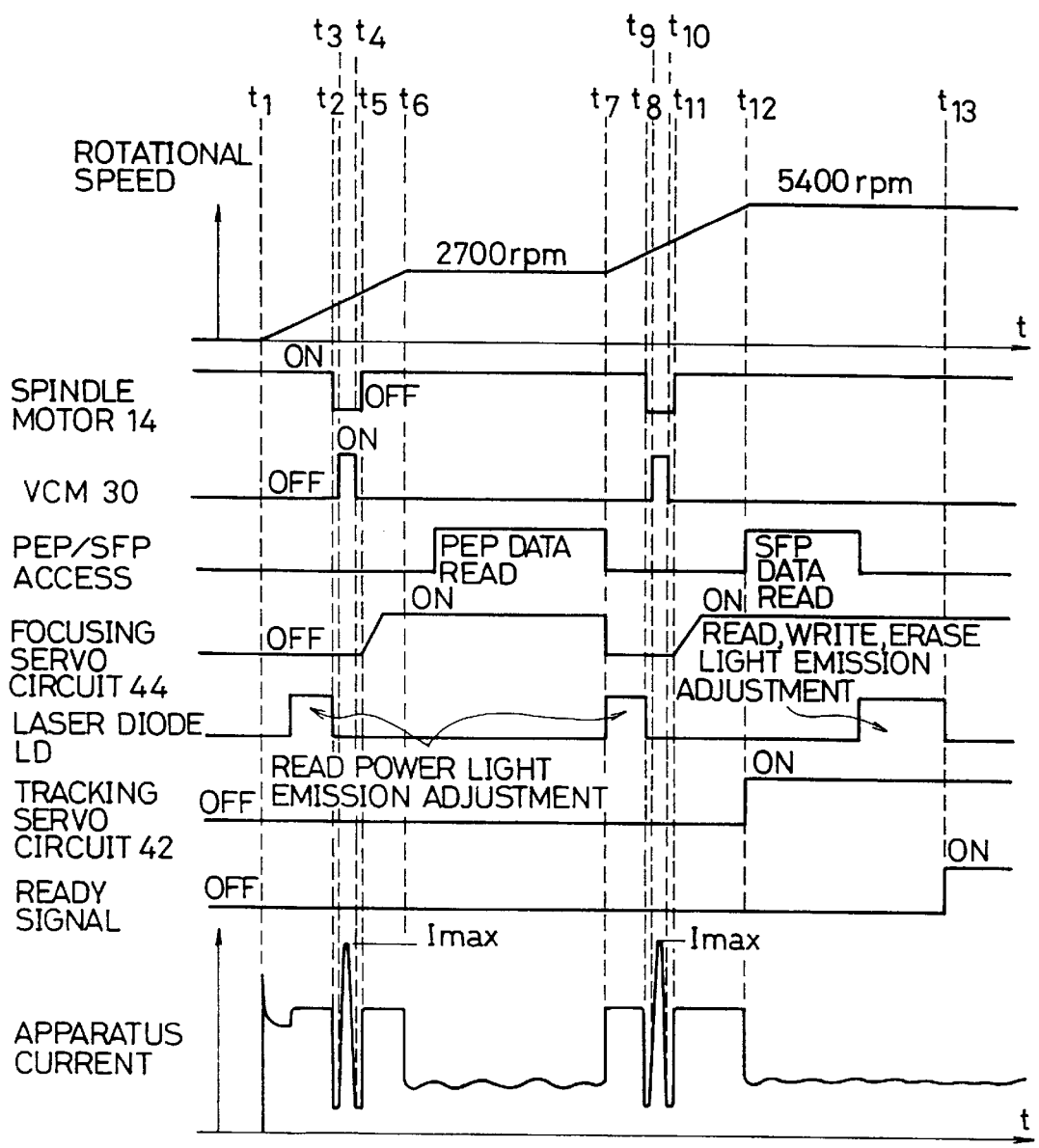
FIG. 21 is a timing chart showing an initialization control according to the embodiment of FIG. 16.

FIG. 21 is a timing chart for the operation when the motor rotational speed is raised according to the embodiment of FIG. 16. When the loading operation of the optical disc 10 to the spindle motor 14 is completed at time $t_1$, the spindle motor 14 is turned on and the acceleration control to raise the rotational speed to the first specific rotational speed of 2700 r.p.m. is executed. During the acceleration by the activation of the spindle motor 14, the light emission of the read power of the laser diode LD is first adjusted. When the light emission adjustment of the read power is finished at time $t_2$, the voice coil motor 30 is turned on at time $t_3$ to move the optical head 28 to the PEP zone of the optical disc 10. The spindle motor 14 is turned off at time $t_2$ just before the voice coil motor 30 is turned on at time $t_3$. The optical head 28 starts the movement by the turn-on of the voice coil motor 30. When the optical head 28 reaches the position of the inner sensor 248, a detection signal is obtained from the inner sensor 248. The voice coil motor 30 is turned off at time $t_4$. The spindle motor 14 is turned on at time $t_5$ just after the turn-off of the motor 30. Therefore, since only the voice coil motor 30 operates for a period of time between $t_3$ to $t_4$ the current of the apparatus is set to $I_{max1}$ in which the current of max I the voice coil motor 30 was added to the current of the other circuit section which had been dropped by a level corresponding to only the turn-off of the spindle motor 14. The peak current can be remarkably suppressed as compared with the current in case of simultaneously driving the spindle motor 14 and the voice coil motor 30. When the spindle motor 14 is again turned on at time $t_5$, the focusing servo circuit 44 is simultaneously turned on and the focusing servo executing adjustment to set the objective lens into an in-focus state is executed. When the rotational speed subsequently reaches the specific rotational speed of 2700 r.p.m. at time $t_6$, the constant speed control is executed. When the constant speed control is started, the data is read out from the PEP zone of the optical disc 10 by the optical head 28. When the reading operation of the data of the PEP zone is finished at time $t_7$, the acceleration control to raise the rotational speed of the spindle motor 14 to the final specific rotational speed of 5400 r.p.m. is executed. Simultaneously with the start of the acceleration control, the write power of the laser diode LD is adjusted to the read power to read the SFP zone on the basis of the read data of the PEP zone. When the light emission adjustment of the read power is finished at time $t_8$, the voice coil motor 30 is driven at time $t_9$, thereby moving the optical head 28 from the PEP zone to the user zone side. In this instance, the spindle motor 14 is turned off at time $t_8$ just before the voice coil motor 30 is turned on and the drive current is set to 0. Thus, the drive current of the spindle motor 14 is set to 0 for a driving period of time of the voice coil motor 30 between $t_9$ and $t_{10}$. A current $I_{max2}$ of the apparatus is reduced by only the amount such that the current of the spindle motor 14 has been set to 0 and the peak current can be suppressed to an enough low value. When the voice coil motor 30 is turned off at time $t_{10}$, the spindle motor 14 is again turned on at time $t_{11}$ just after the turn-off of the motor 30, thereby raising the rotational speed. At the same time, the focusing servo circuit 230 is turned on, thereby starting the operation to start the focusing servo control. Subsequently, when the rotational speed of the spindle motor reaches the final specific rotational speed of 5400 r.p.m. at time $t_{12}$, the control mode of the spindle motor 14 is switched to the constant speed control mode. The tracking servo circuit 238 is simultaneously turned on and the SFP zone is read. The light emission adjustment in each of the reading, writing, and erasing modes which are used for the user zone is executed. After that, a ready signal indicating that the writing and reading operations can be performed to the high-order apparatus is turned on at time $t_{13}$.

Figure 22:
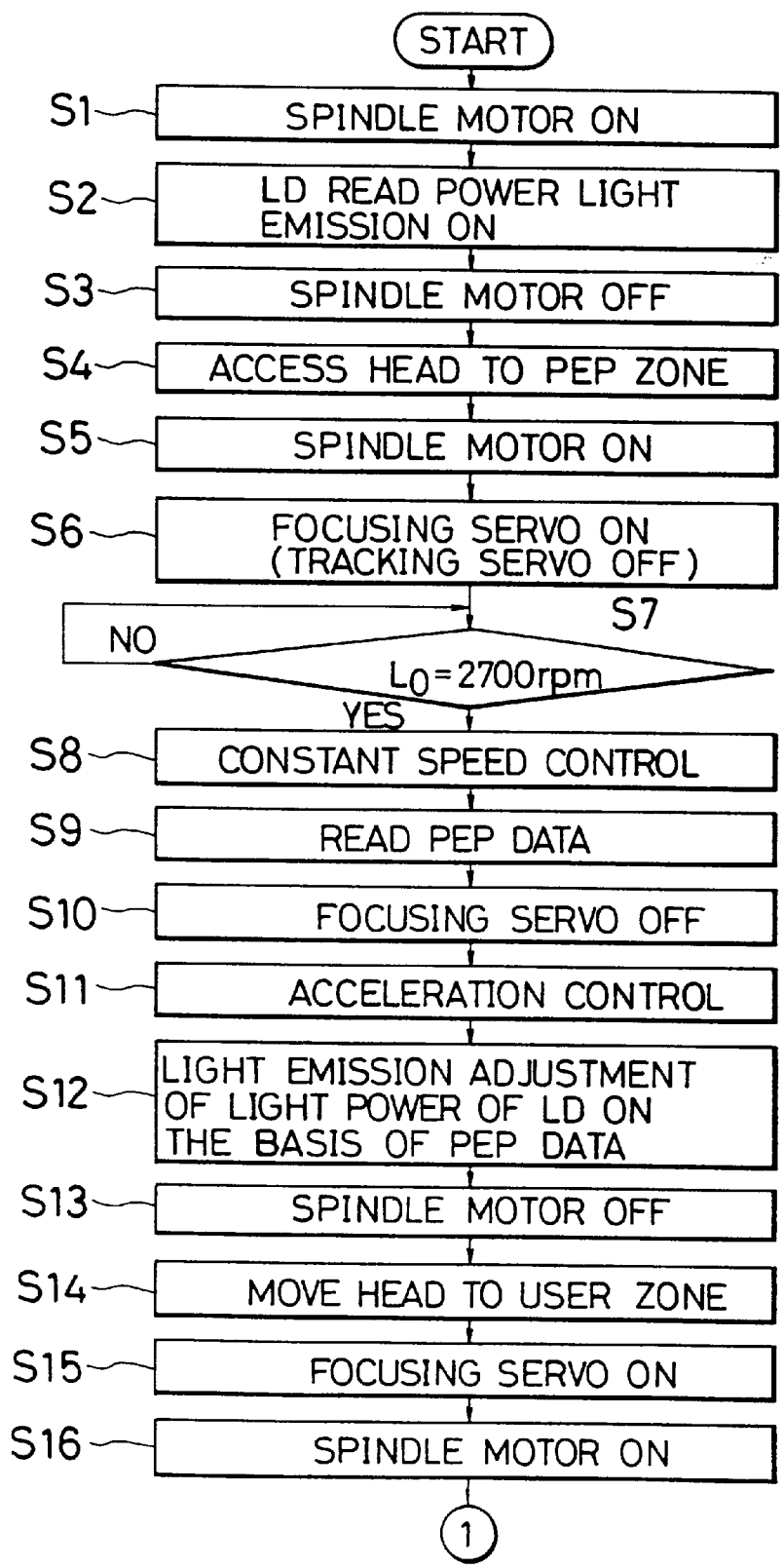
FIG. 22 is a flowchart showing an initialization control according to the embodiment of FIG. 16.
Figure 23:
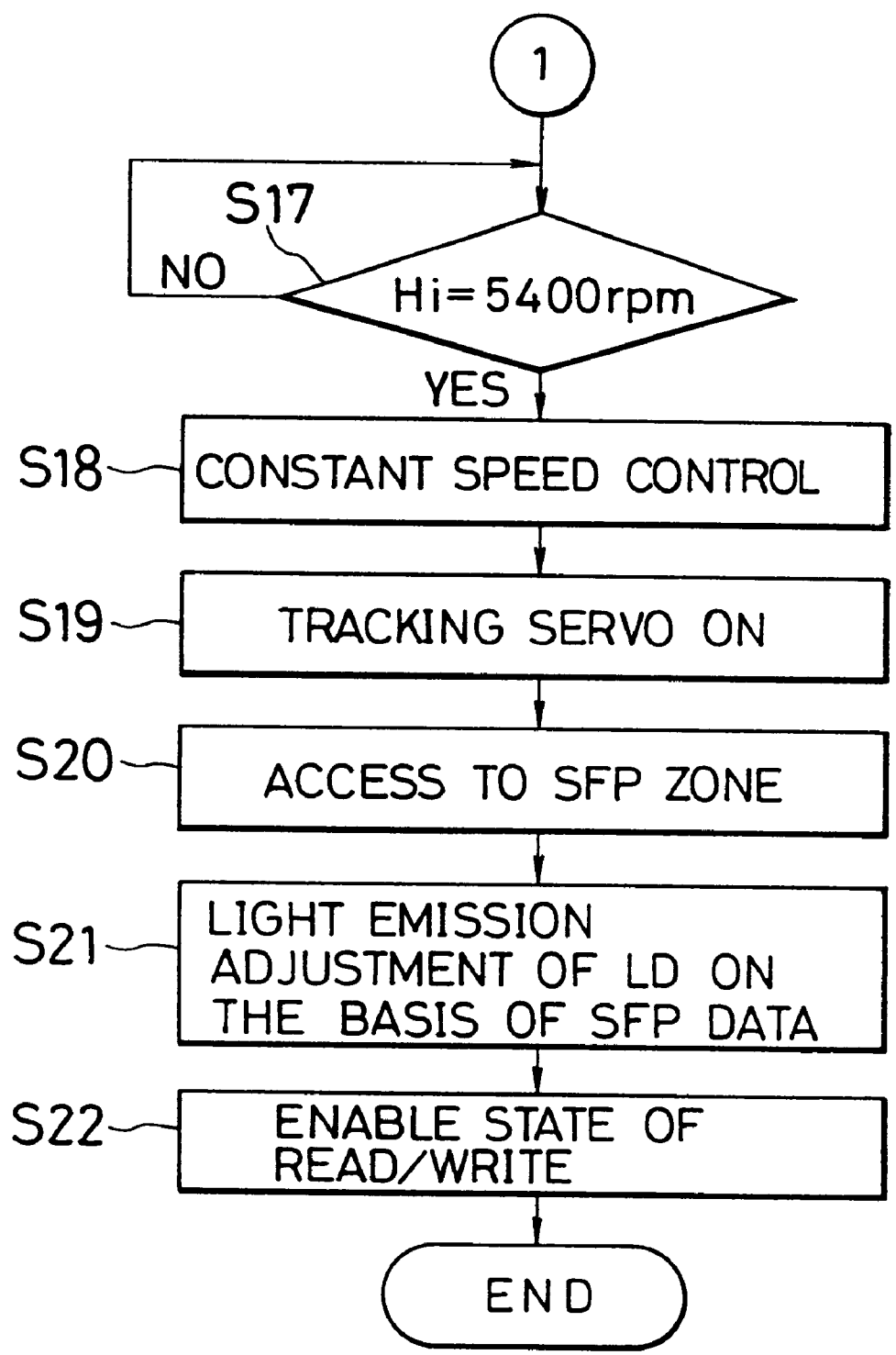
FIG. 23 is a flowchart showing the continuation of the initialization control according to the embodiment of FIG. 16.

FIGS. 22 and 23 are flowcharts showing the initialization control in the rising state of the motor rotational speed in the embodiment of FIG. 16. In FIG. 22, when the loading operation of the disc cassette into the disc apparatus is finished, the spindle motor 14 is activated in step S1. In step S2, the light emission adjustment of the read power of the laser diode LD is performed. In step S3, the current which is supplied to the spindle motor 14 is turned off. In step S4, the voice coil motor 30 is driven to access the optical head 28 to the PEP zone. Since the drive current of the spindle motor 14 in this instance is equal to 0, however, the peak value of the current consumption of the whole apparatus can be remarkably reduced. When the head accessing operation to the PEP zone is completed in step S4, namely, when the detection signal from the inner sensor 248 is obtained, step S5 follows and the spindle motor 14 is again turned on. In this instance, the tracking servo is turned off. In step S7, a check is made to see if the rotational speed has reached the target constant speed $L_o$=2700 r.p.m. or not. If YES, the constant speed control in step S8 is executed. In step S9, the data of the PEP zone in which the optical head is at present located is read. In step S10, the focusing servo circuit 44 is turned off. In step S11, the acceleration control is started so as to obtain the set value $H_1$ of the target high rotational speed ($H_i$=5400 r.p.m.). During the acceleration control, the light emission adjustment of the read power of the laser diode LD is executed on the basis of the read data of the PEP zone in step S14. Subsequently, the voice coil motor 30 is driven to move the optical head 28 from the PEP zone to the user zone. However, prior to driving the voice coil motor 30, the spindle motor 14 is turned off in step S13. In step S14, the voice coil motor 30 is turned on, thereby moving the optial head 28 to the user zone. After completion of the movement of the optical head 28 to the user zone, the focusing servo circuit 30 is turned on in step S15. Further, in step S16, the spindle motor 14 is again turned on, thereby increasing the rotational speed. In step S17 in FIG. 23, when the rotational speed of the spindle motor reaches the set value $H_i$ (=5400 r.p.m.) of the target high rotational speed, the constant speed control in step S18 is executed. In step S19, the tracking servo circuit 238 is turned on. In step S20, the SFP zone is read. In step S21, each light emission adjustment in the reading, writing, and erasing operations for the user zone is executed. After that, the apparatus finally enters the ready state in which the reading and writing operations can be performed in step S22.

In the timing chart of FIG. 21 and the processes of the flowcharts of FIGS. 22 and 23, the PEP zone is read at the specific rotational speed of 2700 r.p.m. during the increasing state of the motor rotational speed and the light emission adjustment of the read power is executed. After the speed reached the next specific rotational speed of 5400 r.p.m., the SFP zone is read by the light emission adjusted read power. The light emission adjustment of each of the read power, write power, and erase power which are used for the actual reading and writing operations is executed. However, it is also possible to construct in a manner such that after the adjustment of the read power based on the reading of the PEP zone 60 and the light emission adjustment of each of the read power, write power, and erase power of the user zone based on the reading of the SFP zone were executed by the constant speed rotation of 2700 r.p.m., the rotational speed can be also raised to 5400 r.p.m.

Figure 24:
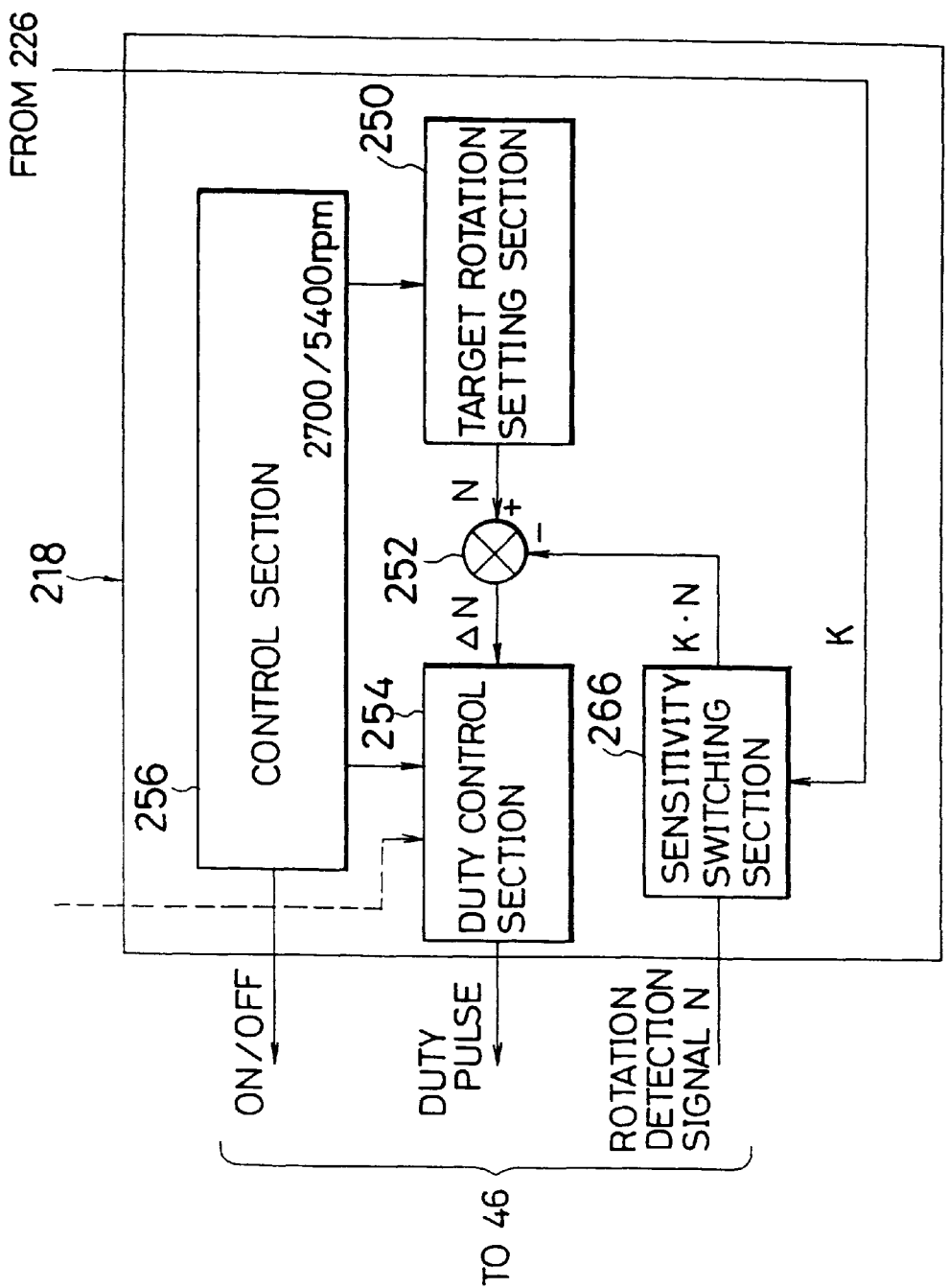
FIG. 24 is a block diagram showing another embodiment of a motor control section in FIG. 16.

FIG. 24 shows an embodiment of the motor control section 218 in FIG. 16. In the embodiment, in addition to the target rotational speed setting section 250, addition point 252, duty control section 254, and control section 256, a sensitivity switching 266 is newly provided. The rotation detection signal N indicative of the actual rotational speed of the spindle motor 14 is supplied to the sensitivity switching section 266. A coefficient K is given to the sensitivity switching section 266 from the motor current limiting section 226 shown in FIG. 2. The sensitivity switching section 266 generates a detection signal (KN) in which the coefficient K was multiplied to the rotation detection signal N to the addition point 252. The current limiting section 226 can vary the value of the coefficient K for the sensitivity switching section 266. That is, when there is no need to limit the current of the spindle motor 14, the coefficient K is set to 1 and the rotation detection signal N is supplied as it is to the addition point 252. On the other hand, in case of limiting the current of the spindle motor 14, the coefficient K is set to a proper value of 1 or more. For example, K is set to 2. Therefore, the rotation detection signal N is doubled (KN= 2N) and a rotation detecting sensitivity is enhanced. Consequently, the rotational speed KN=2N which is higher than the actual detected rotational speed N is given to the addition point 252. When the speed reaches the rotational speed of the half of the target rotational speed $N_0$, the deviation $\Delta N$ is equal to 0 and the constant speed control is executed. Now, assuming that there is a proportional relation between the rotational speed and the drive current, the drive current can be limited to 1/K, namely, 1/2. The limit amount of the motor drive current canbe limited to a further small value by setting the coefficient K to a large value. As another embodiment in which the current of the spindle motor 14 is limited, the maximum value of the ON duty of the motor drive current which is controlled by the duty control section 54 can be also limited by the signal from the motor current limiting section 226. For example, when it is now assumed that the maximum ON duty in the duty control section 254 when there is no need to limit the current of the spindle motor 14 is equal to 80%, when it is intended to limit the current by the driving of the voice coil motor, the maximum value of the ON duty is limited from 80% to a value which is smaller than 80%, for example, to 40%. By limiting the maximum value of the ON duty as mentioned above, even when the deviation $\Delta N$ from the addition point 252 increases as a plus value, the PWM control due to the ON duty exceeding the 40% cannot be executed. Therefore, the motor drive current is saturated by the limit value of the ON duty and can be suppressed to the drive current corresponding to the limit value of the ON duty.

Although the embodiment of FIG. 16 has been described as an example with respect to the case where the exchangeable optical disc has been used as a recording medium, at the time of the start of the power ON of the optical disc apparatus, the invention can be also similalry applied to an optical disc apparatus of the unexchangeable type in which the optical disc is fixedly attached to the spindle motor. As well as the optical disc apparatus, the invention can be also similarly applied to other proper disc apparatuses such as hard disc apparatus, floppy disk apparatus, and the like so long as the initialization adjustments are executed when the motor rotational speed is raised.

The present invention can be obviously realized as an optical disc apparatus in which the control of the loading mechanism in FIGS. 1 to 15 and the control in which the motor current is limited in the initializing process in FIGS. 16 to 24 are combined. Although FIGS. 1 to 15 have been shown and described with respect to the optical disc apparatus, the invention can be also applied to a hard disk apparatus or a floppy disk apparatus. Further, the invention is not limited by the numerical values shown in the foregoing embodiments.

What is claimed is:

1. A disc apparatus comprising:
   first motor means for rotating a recording medium;
   second motor means for positioning head means for writing or reading information to/from said recording medium;
   first motor control means for controlling the first motor means;
   second motor control means for controlling said second motor means;
   disc control means for activating said first motor means by said first motor control means at the start of the use, for driving said second motor means by said second motor control means after a rotational speed of said recording medium reached a predetermined rotational speed, for moving the head means to a desired position of the recording medium, and enabling information to be written or read out to/from the recording medium;
   initialization control means for activating the first motor means and executing a predetermined initialization adjustment for a raising period of time of a motor rotation until a rotational speed of said first motor means reaches a predetermined speed; and
   motor drive limiting means for limiting the driving of said first motor means when the second motor means is driven simultaneously with the first motor means during the initialization adjustment by said initialization control means.

2. An apparatus according to claim 1, wherein said disc apparatus is an optical disc apparatus for optically writing or reading out information to/from said recording medium.

3. An apparatus according to claim 2, wherein said motor drive limiting means sets the drive current of the first motor means to zero for a period of time during which the second motor means is driven simultaneously with the first motor means during the initialization adjustment.

4. An apparatus according to claim 2, wherein said motor drive limiting means reduces the drive current of the first motor means to a predetermined value for a period of time during which the second motor means is driven simultaneously with the first motor means during the initialization adjustment.

5. An apparatus according to claim 2, wherein said first motor control means is duty ratio control means for controlling a duty ratio of the motor drive current so as to set a deviation between a target set signal indicative of a target rotational speed and a detection signal indicative of the rotational speed of the first motor means to zero, and
   said motor drive limiting means limits the maximum duty ratio of the motor drive current which is controlled by the duty ratio control means to a predetermined value for a period of time during which the second motor means is driven simultaneously with the first motor means during the initialization adjustment, thereby suppressing the drive current of the first motor means.

6. An apparatus according to claim 2, wherein said first motor control means is feedback control means for controlling the motor drive current so as to set a deviation between a target set signal to decide a target rotational speed and a current detection signal indicative of the rotational speed of the first motor means to zero, and said motor drive limiting means raises a sensitivity of a circuit to detect the current detection signal indicative of the rotational speed of the first motor means for a period of time during which the second motor means is driven simultaneously with the first motor means during the initialization adjustment and feeding back a detection signal indicative of a current which is higher than an actual value, thereby limiting the drive current of the first motor means.

7. An apparatus according to claim 2, wherein said first motor control means is a feedback control means for controlling the motor drive current so as to set a deviation between a target set signal to decide a target rotational speed and a detection signal indicative of the rotational speed of the first motor means to zero, and said motor drive limiting means multiplies a coefficient of 1 or more to a detection signal indicative of the rotational speed of the first motor means and converts into a detection signal indicative of a rotational speed which is higher than an actual speed and feeds back the converted detection signal for a period of time during which the second motor means is driven simultaneously with the first motor means during the initialization adjustment, thereby limiting the drive current of the first motor means.

8. An apparatus according to claim 7, wherein said feedback control means is duty ratio control means for controlling a duty ratio of the motor drive current so as to set the deviation between the target set signal indicative of the target rotational speed and the detection signal indicative of the rotational speed of the first motor means to zero.

9. An apparatus according to claim 2, wherein said initialization control means accelerates the first motor means to a first specific rotational speed after the first motor means was activated by the first motor control means, executes a constant speed control at the first specific rotational speed for a predetermined period of time, and subsequently perform an acceleration control at a higher second specific rotational speed, and executes a constant speed control to maintain said second specific rotational speed after that.

10. An apparatus according to claim 9, wherein said initialization control means controls in a manner such that during the acceleration control to said first specific speed by said first motor means, the head means is moved to a medium information region out of a user region of said recording medium by the driving of said second motor means by said second motor control means, the information which has previously been recorded in said medium information region is read out by said disc control means during the constant speed control at said first specific rotational speed, the laser diode is light emission adjusted during the acceleration control to said second specific rotational speed so as to provide a write power obtained from said read information, and the head means is moved to the user region by the driving of said second motor means after completion of said light emission adjustment.

11. An apparatus according to claim 10, wherein said motor drive limiting means limits the drive current of said first motor means when the head means is moved to the medium information region by the driving of said second motor means and when the head means is moved to the user region from the medium information region.

12. An apparatus according to claim 10, wherein said initialization control means turns on focusing servo means prior to reading out the medium information region, thereby in-focus controlling an objective lens of the head means.

13. An apparatus according to claim 10, wherein said initialization control means controls in a manner such that after the head means was moved from the medium information region to the user region, focusing servo means is turned on to thereby in-focus control an objective lens of the head means, and further when the rotational speed of the first motor means reaches the second specific rotational speed, tracking servo means is turned on, and a ready signal is generated in a state in which the head means is allowed to trace a track of the recording medium.

14. An apparatus according to claim 2, wherein after completion of the loading operation of the recording medium, said first motor means is activated by said first motor control means.

15. An apparatus according to claim 2, wherein said first motor means is a spindle motor and said second motor means is a voice coil motor.

* * * * *